(12) United States Patent
Nagasawa et al.

(10) Patent No.: US 11,292,450 B2
(45) Date of Patent: Apr. 5, 2022

(54) POWERTRAIN SYSTEM

(71) Applicant: Toyota Jidosha Kabushiki Kaisha, Toyota (JP)

(72) Inventors: Hiroi Nagasawa, Mishima (JP); Yushi Shibaike, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 282 days.

(21) Appl. No.: 16/689,480

(22) Filed: Nov. 20, 2019

(65) Prior Publication Data

US 2020/0198618 A1    Jun. 25, 2020

(30) Foreign Application Priority Data

Dec. 21, 2018  (JP) .............................. JP2018-239768
Mar. 12, 2019  (JP) .............................. JP2019-045080

(51) Int. Cl.
*B60W 20/13* (2016.01)
*B60W 10/08* (2006.01)
*B60W 10/06* (2006.01)

(52) U.S. Cl.
CPC ............ *B60W 20/13* (2016.01); *B60W 10/06* (2013.01); *B60W 10/08* (2013.01)

(58) Field of Classification Search
CPC ..... B60W 20/10–20; B60W 10/04–08; B60W 50/00–06; B60W 2050/0001–065; B60K 6/20; B60K 6/48; F02D 41/02; F02D 41/04; F02D 2200/503
USPC .................................... 701/22, 99, 101, 102
See application file for complete search history.

(56) References Cited

U.S. PATENT DOCUMENTS

| | | | | |
|---|---|---|---|---|
| 2005/0246076 | A1* | 11/2005 | Chen ..................... | B60W 10/26 701/22 |
| 2014/0163789 | A1* | 6/2014 | Yu ......................... | B60W 10/06 701/22 |
| 2015/0120107 | A1* | 4/2015 | Yu ......................... | B60W 20/00 701/22 |
| 2018/0050682 | A1* | 2/2018 | Ahn ....................... | B60K 6/48 |
| 2018/0099658 | A1* | 4/2018 | Ossareh ................ | B60W 20/10 |
| 2019/0184805 | A1* | 6/2019 | Yan ....................... | B60K 6/105 |

(Continued)

FOREIGN PATENT DOCUMENTS

JP         2015-155261 A    8/2015

*Primary Examiner* — Robert A Werner
(74) *Attorney, Agent, or Firm* — Dinsmore & Shohl LLP

(57) ABSTRACT

A powertrain system includes an internal combustion engine, an electric motor, a battery and a control device. The control device is configured to: execute a control input determination processing to solve an optimization problem that minimizes a fuel consumption amount $m_f$ during the control time period while taking dynamics of a charging rate SOC as a constraint, and thereby calculate one or more control input values; and execute a system control processing. The control input determination processing includes: a co-state variable determination processing to update a co-state variable p for each time step while using, as an initial value thereof, a final value or an average value thereof during the last control time period; and a control input calculation processing to use the determined co-state variable p and search for and calculate, for each time step, the one or more control input values that minimize an Hamiltonian H.

8 Claims, 13 Drawing Sheets

(56) References Cited

U.S. PATENT DOCUMENTS

2019/0389451 A1\* 12/2019 Huang .................. B60W 10/06
2020/0101966 A1\* 4/2020 Thibault .................. B60K 6/48
2021/0291804 A1\* 9/2021 Colin .................... B60W 10/08

\* cited by examiner

FIG. 15A Comparative Example 1
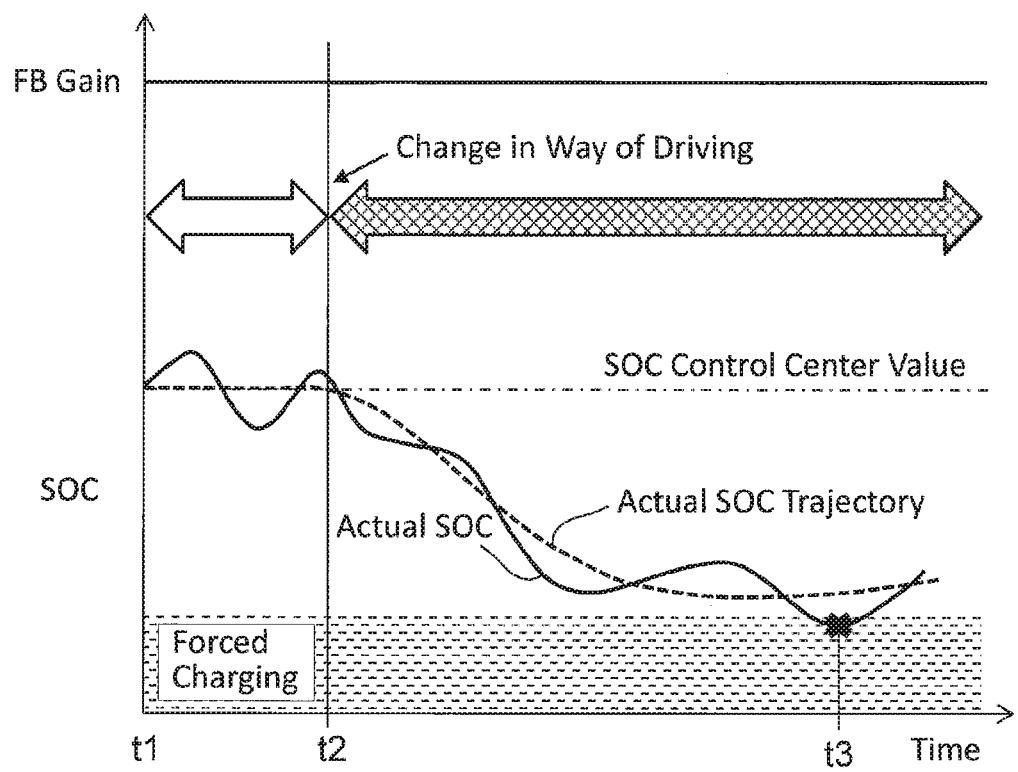
FIG. 15B Comparative Example 2
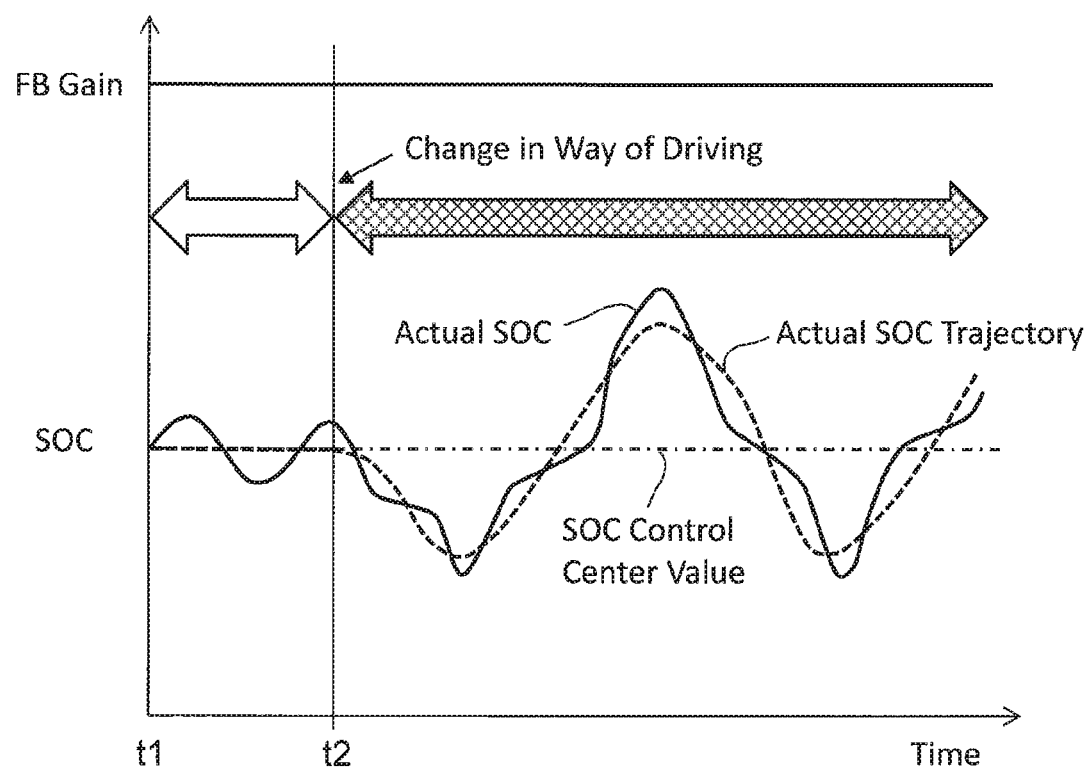

POWERTRAIN SYSTEM

CROSS-REFERENCE TO RELATED APPLICATION

The present disclosure claims priority under 35 U.S.C. § 119 to Japanese Patent Applications No. 2018-239768, filed on Dec. 21, 2018, and No. 2019-045080, filed on Mar. 12, 2019. The contents of these applications are incorporated herein by reference in their entirety.

BACKGROUND

Technical Field

The present disclosure relates to a powertrain system, and more particularly to a powertrain system including an internal combustion engine and an electric motor that are configured to drive a hybrid vehicle, and including a battery configured to supply an electric power to the electric motor.

Background Art

For example, JP 2015-155261 A discloses a hybrid vehicle. This hybrid vehicle includes an internal combustion engine, an electric motor, and a battery that is configured to supply an electric power to the electric motor. The hybrid vehicle is driven by both the internal combustion engine and the electric motor.

According to the hybrid vehicle configured as described above, a charge/discharge plan of the battery to minimize the fuel consumption is created on the entire route from a departure point to a destination point. An optimal driving mode of the hybrid vehicle based on this charge/discharge plan is selected from an engine driving mode, an electric motor driving mode, and an assist driving mode that uses both the internal combustion engine and the electric motor. Also, a charge/discharge control of the battery based on the charge/discharge plan is performed.

SUMMARY

In a powertrain system including an internal combustion engine and an electric motor that are configured to drive a hybrid vehicle and including a battery configured to supply an electric power to the electric motor, it is conceivable to determine an operating point of the powertrain system (hereinafter, abbreviated as a "system operating point") and a charge/discharge amount of the battery as follows.

Specifically, in order to minimize the fuel consumption of the internal combustion engine with respect to vehicle speed and vehicle driving torque used in a desired control time period (for example, a time period from the current time point to the end of a trip), it is conceivable to search for and calculate in advance an optimal control input value that determines the system operating point and the charge/discharge amount at each future time point within this control time period. In order to calculate the optimal control input value in advance at each future time point in this manner, it is necessary to predict the future vehicle speed and the future vehicle driving torque. However, the vehicle speed and the vehicle driving torque during the control time period may not always be as predicted, and, if the prediction cannot be performed for some reason, the search for one or more control input values may not be appropriately performed.

The present disclosure has been made in view of the problem described above, and an object of the present disclosure is to provide a powertrain system configured to determine one or more control input values that minimize the fuel consumption of an internal combustion engine with respect to a vehicle speed and a vehicle driving torque used within a control time period of a powertrain control without requiring prediction of future vehicle speed and future vehicle driving torque.

A powertrain system according to the present disclosure includes: an internal combustion engine configured to drive a hybrid vehicle; an electric motor configured to drive the hybrid vehicle; a battery configured to supply an electric power to the electric motor and a control device configured to perform a powertrain control for controlling the internal combustion engine and the electric motor. The control device is configured, during a control time period in which the powertrain control is performed, to: execute a control input determination processing to solve an optimization problem that minimizes, with respect to a speed and a driving torque of the hybrid vehicle, a fuel consumption amount $m_f$ of the internal combustion engine during the control time period while taking dynamics of a charging rate SOC of the battery as a constraint, and thereby calculate one or more control input values that determine a charge/discharge amount of the battery and a system operating point of the powertrain system; and execute a system control processing to apply, to the powertrain system, the one or more control input values calculated by the control input determination processing, and thereby control the internal combustion engine and the electric motor. The control input determination processing includes: a co-state variable determination processing to update a co-state variable p of the optimization problem for each time step while using, as an initial value of the co-state variable p, a final value or an average value of the co-state variable p during a last control time period; and a control input calculation processing to use the co-state variable p determined by the co-state variable determination processing and search for and calculate, for each time step, the one or more control input values that minimize an Hamiltonian H defined by a following equation:

$$H = \dot{m}_f + p \cdot \dot{SOC}$$

where a first term on a right-hand side of the equation denotes a time rate of change $dm_f/dt$ of the fuel consumption amount $m_f$, and a second term on the right-hand side denotes a product of the co-state variable p and a time rate of change $dSOC/dt$ of the charging rate SOC.

The co-state variable determination processing may include a co-state variable correction processing to correct the co-state variable p based on a difference between a target charging rate and an actual charging rate of the charging rate SOC.

Where the actual charging rate is lower than the target charging rate, the co-state variable correction processing may decrease the co-state variable p.

Where the actual charging rate is higher than the target charging rate, the co-state variable correction processing may increase the co-state variable p.

A correction amount of the co-state variable p according to the co-state variable correction processing may be a product of the difference and a gain. The gain may also be set based on a driving record of the hybrid vehicle.

The driving record may include at least one of an average vehicle speed that is an average value of the speed during a first designated time period and an average driving torque that is an average value of the driving torque during a second time designated period.

Where the driving record may include the average vehicle speed, the higher the average vehicle speed is, the greater the gain is.

Where the driving record may include the average driving torque, the higher the average driving torque is, the greater the gain is.

According to the powertrain system of the present disclosure, one or more control input values that minimize the Hamiltonian H defined by the equation described above are calculated. Therefore, an optimal control input value that minimizes the fuel consumption amount can be determined for each time step. The one or more control input values are used to determine the charge/discharge amount of the battery and the system operating point of the powertrain system. Therefore, the charge/discharge amount and the system operating point can be appropriately determined in accordance with the determined optimal control input value.

Moreover, according to the control input determination processing of the present disclosure, the final value or the average value of the co-state variable during the last control time period is used as the initial value of the co-state variable of the target optimization problem. As a result, even if future vehicle speed and future driving torque (i.e., the vehicle speed and driving torque in a time period in which optimization of the one or more control input values is desired) are unknown (in other words, without requiring prediction of future vehicle speed and future driving torque), the charge/discharge amount and the system operating point can be appropriately determined for each time step.

BRIEF DESCRIPTION OF THE DRAWINGS

FIG. 15A is a time chart used to describe the operation in an example of using a co-state variable correction processing (comparative example 1) referred to for a comparison with a co-state variable correction processing according to the third embodiment of the present disclosure;

FIG. 15B is a time chart used to describe the operation in an example of using a co-state variable correction processing (comparative example 2) referred to for a comparison with a co-state variable correction processing according to the third embodiment of the present disclosure.

DETAILED DESCRIPTION

Figure 1:
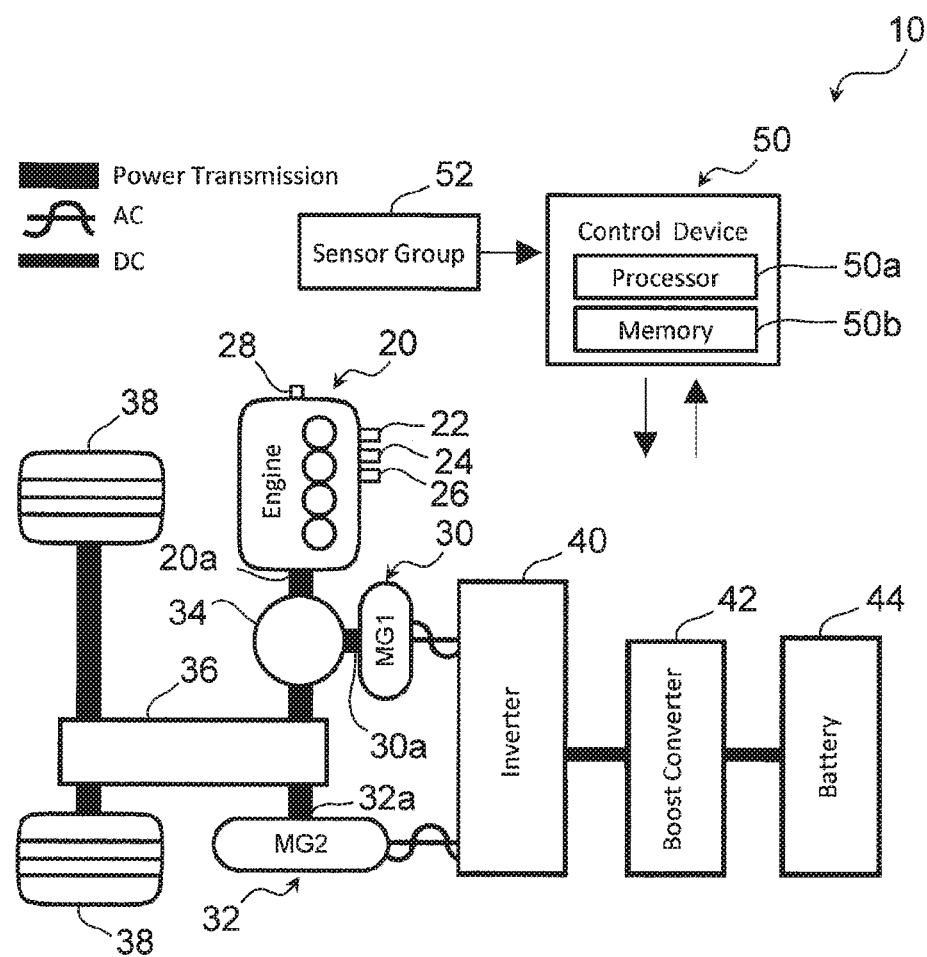
FIG. 1 is a schematic diagram that illustrates an example of the configuration of a powertrain system according to a first embodiment of the present disclosure.

In the following, embodiments according to the present disclosure will be described with reference to the accompanying drawings. However, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically.

1. First Embodiment

A first embodiment according to the present disclosure will be described with reference to FIGS. 1 to 5.

1-1. Example of Configuration of Powertrain System

FIG. 1 is a schematic diagram that illustrates an example of the configuration of a powertrain system 10 according to the first embodiment of the present disclosure. The powertrain system 10 shown in FIG. 1 is provided with a first motor generator (hereunder, abbreviated as "MG1") 30 and a second motor generator (hereunder, abbreviated as "MG2") 32 as well as an internal combustion engine 20, as power sources of a vehicle. That is to say, the powertrain system 10 is applied to a hybrid vehicle as an example.

As an example, the internal combustion engine 20 is a spark ignition engine. However, an internal combustion engine according to the present disclosure may alternatively be a compression ignition engine, and the number and arrangement of cylinders thereof are not particularly limited. As actuators for controlling engine torque Te, the internal combustion engine 20 is equipped with a throttle valve 22, fuel injection valves 24 and an ignition device 26. The throttle valve 22 is arranged in an intake air passage (not shown) and controls intake air flow rate. Each of the fuel injection valves 24 is arranged for the corresponding cylinder, and injects fuel, for example, directly into the corresponding cylinder. The ignition device 26 ignites an air-fuel mixture in each cylinder by the use of a spark plug arranged for each cylinder. In addition, the internal combustion engine 20 is provided with various sensors used in various engine controls. The various sensors mentioned here include a crank angle sensor 28 that outputs a signal responsive to crank angle.

The MG1 30 and the MG2 32 are both electric motors that can generate electric power. That is to say, the MG1 30 and the MG2 32 have both a function as an electric motor that outputs a torque using a supplied electric power and a function as a generator that transduces an inputted mechanical power into the electric power, which are alternate current synchronous motor generators, for example. According to the powertrain system 10 shown in FIG. 1, the MG1 30 is mainly used as a generator, and the MG2 32 is mainly used as an electric motor for driving the vehicle. Because of this, in the example of the powertrain system 10, the MG2 32 among the MG1 30 and MG2 32 corresponds to an example of the "electric motor" according to the present disclosure. In addition, since, in some operating conditions, the MG1 30 may generate a driving torque of the vehicle by generating a negative torque to sustain the engine torque Te, the MG1 30 also corresponds to an example of the "electric motor" according to the present disclosure in addition to the MG2 32.

The internal combustion engine 20, the MG1 30 and the MG2 32 are coupled to wheels 38 via a power split device 34 and a speed reducer 36. The power split device 34 is, for example, a planetary gear unit and splits the engine torque Te, into the MG1 30 and the wheels 38, outputted from the internal combustion engine 20. To be more specific, in the power split device 34: a sun gear is coupled to an output shaft 30a of the MG1 30; a planetary carrier is coupled to a crankshaft 20a of the internal combustion engine 20; and a ring gear is coupled to an output shaft 32a of the MG2 32. The ring gear is engaged with the sun gear via a plurality of pinion gears that are rotatably supported by the planetary carrier. The engine torque Te outputted from the internal combustion engine 20 or the MG2 torque Tm outputted from the MG2 32 is transmitted to the wheels 38 via the speed reducer 36. That is to say, the internal combustion engine 20 and the MG2 32 generate and control the driving force of the vehicle. The MG1 30 can regenerate an electric power using the engine torque Te supplied from the internal combustion engine 20 via the power split device 34. Because of this, the MCG 30 is also used to control the driving force of the vehicle. In addition, the MG2 32 functions as a generator during the braking of the vehicle, and recovers the kinetic energy of the vehicle to convert it to electric power.

The MG1 30 and the MG2 32 each exchange electric power with a battery 44 via an inverter 40 and a boost converter 42. The inverter 40 is configured to convert the electric power stored in the battery 44 from direct current (DC) to alternating current (AC) to supply this AC electric power to the MG2 32, and also configured to convert the electric power generated by the MG1 30 and the MG2 32 from AC to DC to store this DC electric power in the battery 44. Because of this, the battery 44 is charged with the electric power generated by the MG1 30 and the MG2 32, and the electric power stored in the battery 44 is discharged when it is consumed by the MG2 32. The boost converter 42 boosts the voltage of the battery 44 as necessary.

The powertrain system 10 according to the present embodiment is further provided with a control device 50 for controlling the powertrain (the internal combustion engine 20, the MG1 30 and the MG2 32). The control device 50 is an electronic control unit (ECU) that includes a processor 50a and a memory 50b. The memory 50b stores programs for controlling the powertrain system 10. The processor 50a reads out a program from the memory 50b to execute the program. The control device 50 receives sensor signals from various sensors for controlling the powertrain. Moreover, the processor 50a executes various programs using the received sensor signals and outputs actuating signals for operating various actuators of the powertrain.

The control device 50 is electrically connected to the various sensors used for the control of the powertrain, such as a sensor group 52 including an accelerator position sensor, a brake position sensor and a vehicle speed sensor in addition to the aforementioned various sensors for the engine controls, such as the crank angle sensor 28. The control device 50 can calculate an engine speed Ne by the use of the signals of the crank angle sensor 28.

Furthermore, the control device 50 is electrically connected to the various actuators for controlling the powertrain including the internal combustion engine 20 (the throttle valve 22, the fuel injection valves 24 and the ignition device 26), the MG1 30 and the MG2 32. In addition, the control device 50 is configured to calculate a charging rate (SOC: State Of Charge) of the battery 44. More specifically, the SOC corresponds to the ratio (%) of the present charge amount with respect to the full charge amount of the battery 44. Although the manner of obtaining the SOC is not particularly limited, the SOC can be obtained (calculated) by, for example, using an electric current sensor for measuring the electric current flowing into and out the battery 44 and integrating the measured electric current with time. It should be noted that the control device 50 may alternatively be configured with a plurality of ECUs.

In the present powertrain system 10 using the power split device 34 described above, when the required driving torque of the vehicle is referred to as Tp, the torque and the rotational speed of the MG1 30 are referred to as Tg and Ng, and the torque and the rotational speed of the MG2 32 are referred to as Tm and Nm, relationships between main parameters used to when the powertrain system 10 controls the vehicle can be expressed as the following Equations (1) to (4). It should be noted that, in Equations (1) to (4), reference characters g1 to g6 are positive values. More specifically, the reference characters g1 to g3 and g6 denote gear ratios of the power split device 34, and the reference characters g4 and g5 denote values determined including not only gear ratios of the power split device 34 but also a differential gear ratio and a tire diameter used to convert the vehicle speed v into the rotational speed of the ring gear.

$$Tm = (Tp - Te \cdot g1)/g2 \qquad (1)$$

$$Tg = -Te \cdot g3 \qquad (2)$$

$$Nm = v \cdot g4 \qquad (3)$$

$$Ng = v \cdot g5 + Ne \cdot g6 \qquad (4)$$

According to the relationships of Equations (1) to (4) described above, under a vehicle speed v and a required driving torque (i.e., a required value of the vehicle driving torque) Tp, if the engine torque Te and the engine speed Ne are determined, the current charge/discharge amount Pchg of the battery 44 and the current operating point of the powertrain system 10 (hereinafter, abbreviated as "system operating point") are determined. To be more specific, when the system operating point is determined, that the torque Te and the rotational speed (engine speed) Ne of the internal combustion engine 20, the torque Tg and the rotational speed Ng of the MG1 30, and the torque Tm and the rotational speed Nm of the MG2 32 are determined as a result. In addition, when the torque Tg and the rotational speed Ng of the MG1 30 and the torque Tm and the rotational speed Nm of the MG2 32 are determined, the charge/discharge amount Pchg of the battery 44 is determined as a result. This is because the charge/discharge amount Pchg is a value that depends on a product of the torque Tg and the rotational speed Ng of the MG1 30, and a product of the torque Tm and the rotational speed Nm of the MG2 32. When the charge/discharge amount Pchg of the battery 44 is determined, the SOC can be determined.

In addition, even where the MG1 rotational speed Ng is determined together with the engine torque Te instead of the engine speed Ne according to the relationship of Equation (4), the charge/discharge amount and the system operating point can also be determined in the same manner. Moreover, the MG1 torque Tg may be used instead of the engine torque Te in order to determine the charge/discharge amount Pchg and the system operating point according to the relationship of Equation (2). Furthermore, according to the relationship of Equation (3), even where the MG2 rotational speed Nm is given together with the required driving torque Tp instead of the vehicle speed v, the charge/discharge amount Pchg and the system operating point can also be determined in the same manner as described above. The vehicle driving torque corresponds to the driving load of the vehicle.

1-2. Powertrain Control

Figure 2:
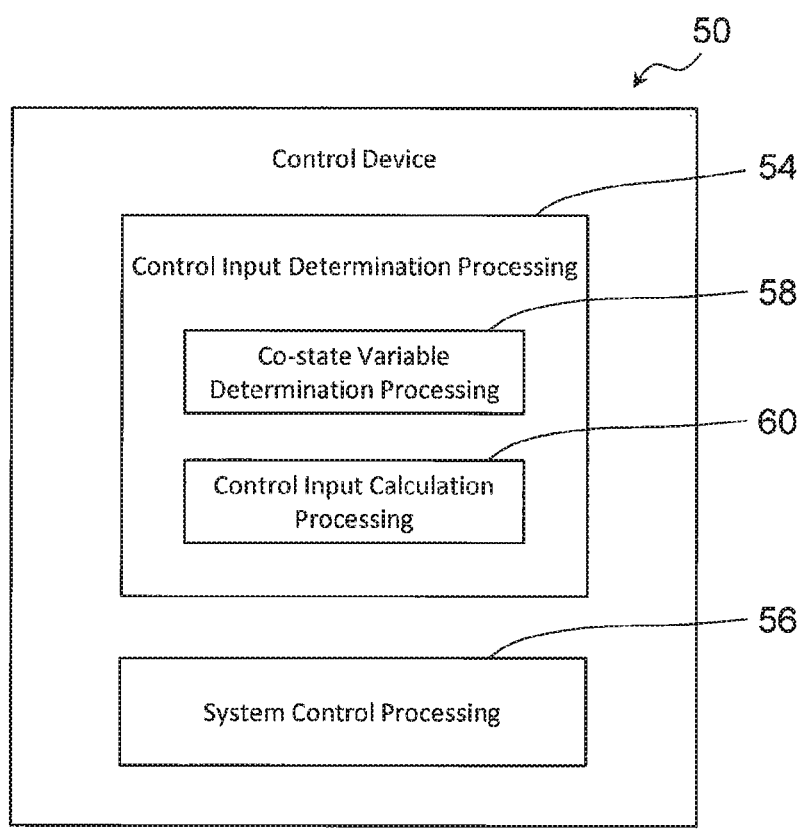
FIG. 2 is a block diagram that shows a processing executed by a control device in association with a powertrain control according to the first embodiment of the present disclosure.

The control device 50 performs a powertrain control for controlling the internal combustion engine 20, the MG1 30, and the MG2 32 to drive the vehicle. FIG. 2 is a block diagram that shows a processing executed by the control device 50 in association with the powertrain control according to the first embodiment of the present disclosure. The processing performed by the control device 50 in association with the powertrain control includes a "control input determination processing 54" and a "system control processing 56". These processings are performed during a control time period τ in which the powertrain control is performed. An example of this control time period τ is one trip of the vehicle, which is a time period from a start of the system operation to a stop thereof. However, the control time period τ in which the powertrain control is performed is not necessarily limited to one trip, and may be a desired partial time period during one trip.

1-2-1. Control Input Determination Processing 54

The SOC of the battery 44 fluctuates due to a change in the charge/discharge amount Pchg of the battery 44 during the operation of the powertrain system 10 (i.e., during the driving of the vehicle). The control input determination processing 54 is performed to determine control input values u by solving an optimization problem (minimization problem) of minimizing fuel consumption amount $m_f$ of the internal combustion engine 20 during the control time period τ with respect to the vehicle speed v and the required driving torque Tp while taking the dynamics (dynamic behavior) of a charging rate SOC of the battery as a constraint. Various parameters can be used as the control input values u, as long as they can determine the charge/discharge amount Pchg of the battery 44 and the system operating point. According to the example of the powertrain system 10 having the configuration shown in FIG. 1, the engine torque Te and the engine speed Ne correspond to the control input values u. In other words, the control input determination processing 54 is performed to calculate control input values for minimizing the fuel consumption amount $m_f$, which are hereinafter referred to as "optimal control input values u*". The calculation of the optimal control input value u* is performed for each designated time step Δt. As a result, the charge/discharge amount Pchg of the battery 44 and the system operating point that can minimize the fuel consumption amount $m_f$ are obtained for each time step Δt.

According to this optimization problem, a Hamiltonian H defined by the following Equation (5) is used. As shown in Equation (5), the Hamiltonian H is the sum of a rate of fuel consumption $dm_f/dt$, which is the time rate of change of the fuel consumption amount $m_f$, and a product of a co-state variable p of the present optimization problem and a time rate of change dSOC/dt of the SOC. The rate of fuel consumption $dm_f/dt$ can be expressed as a function of the engine torque Te and the engine speed Ne, as expressed by Equation (9) described below. The time rate of change dSOC/dt of the SOC is expressed by a function f of the SOC, the engine speed Ne, the engine torque Te, the vehicle speed v, and the required driving torque Tp, as expressed by the following state equation (Equation (6)) that represents the dynamics (dynamic behavior) of the SOC. In addition, minimizing the Hamiltonian H defined as just described means minimizing the total energy consumption concerning fuel consumption and power consumption of the battery 44 that are determined by the co-state variable p under the balance of these fuel consumption and power consumption.

$$H = \dot{m}_f + p \cdot \dot{SOC} \tag{5}$$

$$\dot{SOC} = f(SOC, Ne, Te, v, Tp) \tag{6}$$

The following Equation (7) expresses a relationship to be satisfied by the co-state variable p in Equation (5). In Equation (7), Ne* and Te* are values obtained when the engine speed Ne and the engine torque Te correspond to the optimal control input values u*. Moreover, Equation (8) shows a range (i.e., set U) of values of the engine speed Ne and the engine torque Te which can be used as the control input values u in the present optimization problem. As shown in Equation (8), in an EV mode in which the internal combustion engine 20 is stopped and the vehicle is driven using only the MG2 32, the engine speed Ne and the engine torque Te are both zero. Furthermore, the values of the engine speed Ne and the engine torque Te included in the set U include values that can be taken in an HV mode (engine on range), which is a vehicle driving mode in which the internal combustion engine 20 is operating. In detail, the set U also includes values that can be taken under the hardware constraints of the internal combustion engine 20 and constraints of the MG1 rotational speed Ng and the rotational speed of pinion gears of the power split device 34. Therefore, Equation (8) corresponds to constraint conditions of the present optimization problem together with Equation (6) described above.

$$\dot{p} = -\left(\frac{\partial H}{\partial SOC}\right)^T \cdot (SOC, Ne^*, Te^*, p) \tag{7}$$

$$Ne, Te \in U = \{EVmode(Ne, Te = 0)\} \cup (Ne, Te \text{ in engine on range}) \tag{8}$$

(Co-state Variable Determination Processing 58 and Control Input Calculation Processing 60)

As shown in FIG. 2, the control input determination processing 54 includes a "co-state variable determination processing" 58 and a "control input calculation processing" 60. The control input calculation processing 60 searches for and calculates control input values u(t) that minimize the Hamiltonian H defined by Equation (5) for each time step Δt. This optimization problem can be considered as a problem of obtaining the control input values u(t) which minimizes the Hamiltonian H, and this problem is expressed by the following Equation (9). That is to say, the Hamiltonian H expressed on the right-hand side of Equation (9) corresponds to an objective function of this problem. The control input values u(t) that minimize the Hamiltonian H at each sample time t can be calculated by solving the problem expressed by Equation (9) using, for example, the quasi-Newton method.

$$u(t) = \mathrm{argmin}_{[Nr,Te] \in U} \dot{m}_f(Ne,Te) + p(t) \cdot f(SOC,Ne,Te,v,Tp) \quad (9)$$

In addition, in the example of the powertrain system 10, the control input calculation processing 60 is used to search for and calculate optimal control input values $u^{*HV}$(t) that minimize, for each time step Δt, a Hamiltonian $H_{HV}$ (see Equation (10) described below) in the HV mode. On that basis, the powertrain system 10 is configured to enable the EV mode as well as the HV mode. In the powertrain system 10 configured as described above, the control input determination processing 54 determines the optimal control inputs u* that minimize the Hamiltonian H (i.e., that minimize the fuel consumption amount $m_f$) by the use of the following manner. That is to say, according to the control input determination processing 54, the optimal control input values u* are determined from the optimal control input values $u^{*HV}$ in the IV mode calculated by the control input calculation processing 60 and control input values $u^{EV}$ in the EV mode where Ne and Te are both zero.

To be more specific, when the Hamiltonian $H_{HV}$ is smaller than a Hamiltonian $H_{EV}$ (see Equation (11) described below) in the EV mode, the optimal control input values $u^{HV}$ are treated as the optimal control input values u*. Thus, when this kind of optimal control input values u* are given to the powertrain system 10 during the EV mode, the internal combustion engine 20 is started. On the other hand, when the Hamiltonian $H_{EV}$ is smaller than the Hamiltonian $H_{HV}$, the control input values $u^{EV}$ are treated as the optimal control input values u*. Also, when the Hamiltonian $H_{EV}$ is smaller than the Hamiltonian $H_{HV}$, the optimal engine speed Ne* and the optimal engine torque Te* that correspond to the optimal control input values u* are both zero. Thus, if this kind of optimal control input values u* are given to the powertrain system 10 during the HV mode, the internal combustion engine 20 is stopped. It should be noted that, in an example of a powertrain system of a hybrid vehicle that does not use the EV mode, the optimal control input values $u^{*HV}$ in the HV mode described above may be used as the optimal control input values u* as they are.

The Hamiltonian $H_{HV}$ in the HV mode and the Hamiltonian $H_{EV}$ in the EV mode at a sample time t are expressed by the following Equations (10) and (11), respectively. It should be noted that a set Ue in Equation (10) is the same as the range of Ne and Te (Ne, Te in engine on range) in Equation (9). In addition, in the calculation of the Hamiltonian $H_{HV}$ in the HV mode, the values of the engine speed Ne and the engine torque Te that are substituted into the function of the rate of fuel consumption $dm_f/dt$ on the right-hand side of Equation (10) and the function f of the SOC are $Ne^{*HV}$ and $Te^{*HV}$ corresponding to the optimal control input values $u^{*HV}$ in the HV mode. Moreover, in the calculation of the Hamiltonians $H_{HV}$ and $H_{EV}$, values obtained by the processing of step S100 described below can be used as the SOC, the current vehicle speed v and the required driving torque Tp that are substituted into the function f of the SOC. Values obtained by the processing of step S102 described below can be used as the co-state variable p(t) multiplied by the functions f.

$$H_{HV}(t) = \min_{[Ne,Te] \in U_e} \dot{m}_f(Ne,Te) + p(t) \cdot f(SOC,Ne,Te,v,Tp) \quad (10)$$

$$H_{EV}(t) = p(t) \cdot f(SOC,0,0,v,Tp) \quad (11)$$

In the following description, "t" is used to indicate successive times, and "k" is used to indicate discrete times (i.e., times for each time step Δt). For the calculation of the control input values u(t) by the control input calculation processing 60, the co-state variable p(t) determined by the co-state variable determination processing 58 is given together with the current SOC, the current vehicle speed v and the required driving torque Tp. In detail, the final value $p_f$ of the co-state variable p during the last control time period τ of the vehicle is used as the initial value $p_0$ of the co-state variable p (i.e., the co-state variable p(0) when the sample time k=0). It should be noted that, instead of the final value pt, the initial value $p_0$ may be an average value $p_{AVE}$ of the co-state variable p calculated at the respective sample times k during the last control time period τ.

With respect to the second and subsequent calculations of the co-state variable p after the start of the control time period τ, according to the co-state variable determination processing 58, the co-state variable p(t) is sequentially calculated and updated for each time step Δt. In more detail, the update of this co-state variable p(t) (i.e., the calculation of the co-state variable p(k+1) at the next sample time k+1 is performed by mathematically solving Equation (7) while substituting, into Equation (7), the SOC(k), the optimal control input values u*(k) (=optimal values Ne*(k) and Te*(k) of the engine speed Ne and the engine torque Te) and the co-state variable p(k) that are of the current sample time k. It should be noted that the calculation of the optimal control input values u*(k) (=optimal values Ne*(k) and Te*(k)) are performed in consideration of not only the HV mode but also the EV mode.

Figure 3:
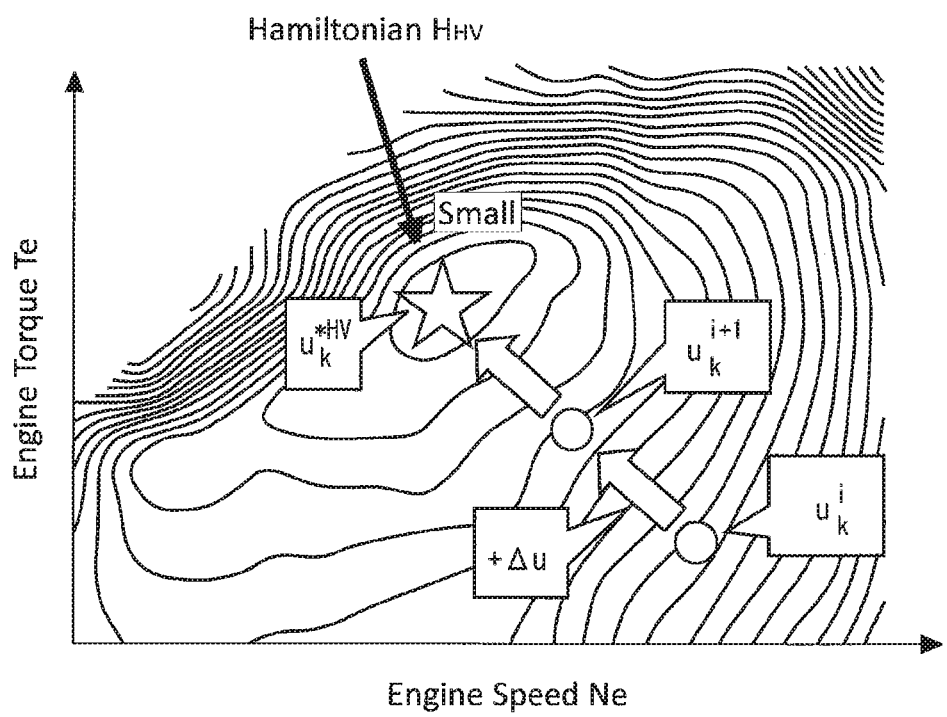
FIG. 3 is a conceptual diagram of the search for control input values $u_k$ (optimal control input values $u_k^{*HV}$) that minimize a Hamiltonian H.

FIG. 3 is a conceptual diagram of the search for the control input values $u_k$ (optimal control input values $u_k^{*HV}$) that minimize the Hamiltonian H (more specifically, $H_{HV}$). In FIG. 3, contour lines of the Hamiltonian $H_{HV}$ are represented on a plane whose coordinate axes are the engine speed Ne and the engine torque Te corresponding to the control input values u. Also, FIG. 3 shows process in which the control input value $u_k$ (=u(k)) at the sample time k approaches the optimal control input value $u_k^{*HV}$ during the search by the control input calculation processing 60 shown in FIG. 2. More specifically, FIG. 3 shows that, when the control input value $u_k$ is moved by a designated value Δu with respect to the i-th search value $u_k^i$, the Hamiltonian $H_{HV}$ is smaller than at the subsequent i+1-th search value $u_k^{i+1}$ than at the i-th search value $u_k^i$. In the example shown in FIG. 3, the optimal control input value $u_k^{*HV}$ to minimize the Hamiltonian $H_{HV}$ is obtained in the next i+2-th search. The calculation of the optimal control input value $u_k^{*HV}$ using this kind of search can be performed using, for example, the quasi-Newton method.

Figure 4:
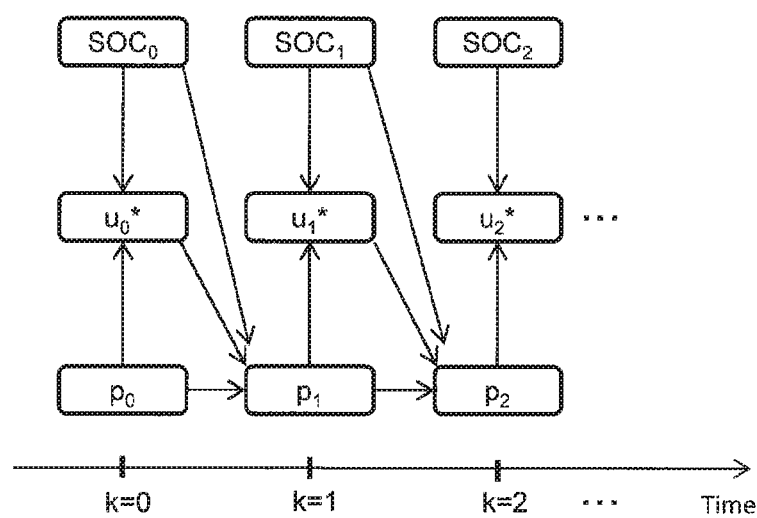
FIG. 4 is a diagram that conceptually shows how an optimal control input value u* and a co-state variable p used for the calculation of the optimal control input value u* are repeatedly calculated for each time step Δt.

Next, FIG. 4 is a diagram that conceptually shows how the optimal control input value u* and the co-state variable p used for the calculation of the optimal control input value u* are repeatedly calculated for each time step $\Delta t$. As shown in FIG. 4, at the first sample time (k=0) corresponding to the starting time of the control time period $\tau$ (for example, the starting time of the operation of the powertrain system 10), the control input calculation processing 60 calculates the optimal control input value $u(0)^*(=u_0^*)$. The optimal control input values $u_0^*$ (i.e., $Ne_0^*$ and $Te_0^*$) are calculated by solving the optimization problem represented by Equation (9) using the initial value $p_0$ of the co-state variable p, the current (actual) $SOC_0$, the current vehicle speed v (not shown) and the required driving torque Tp (not shown). It should be noted that the calculation of the optimal control input values $u(t)^*$ described with reference to FIG. 4 is performed in consideration of not only the HV mode but also the EV mode.

Moreover, at the first sample time (k=0), the co-state variable determination processing 58 solves Equation (7) into which the optimal control input values $u_0^*(Ne_0^*$ and $Te_0^*$), the $SOC_0$ and the initial value $p_0$ are substituted. As a result, the co-state variable $p_1$ used in the calculation at the next sample time (k=1), that is, one time step $\Delta t$ later, is calculated.

At the next sample time (k=1), the control input calculation processing 60 uses the co-state variable $p_1$ and the current SOC, that are calculated as described above and the current vehicle speed v and the required driving torque Tp to calculate the optimal control input value $u_1^*$. Thereafter, the similar calculation is repeatedly performed for each time step $\Delta t$.

1-2-2. System Control Processing 56

The system control processing 56 shown in FIG. 2 controls the internal combustion engine 20, the MG1 30 and the MG2 32 by giving, to the powertrain system 10, the optimal control input values $u(t)^*$ (i.e., $Ne^*$ and $Te^*$) determined as described above by the control input determination processing 54. In more detail, on the basis of the determined optimal control input values $u(t)^*$ (i.e., $Ne^*$ and $Te^*$), respective target values of the engine torque Te, the MG1 torque Tg, and the MG2 torque Tm at the sample time k are determined by using the following manner as an example.

Equation (12) described below shows equations of motion for the driveline of the powertrain system 10. In other words, Equation (12) is linear equations of state that define relationships between the required driving torque Tp (Nm), the charge/discharge amount Pchg (W), and a rate of change $dNe/dt$ (rad/s$^2$) of the engine speed Ne which correspond to the state quantities (control variables) controlled by the powertrain system 10, and the individual torques Te, Tg, and Tm (Nm), which are the manipulated variables of the torque devices (the internal combustion engine 20, the MG1 30 and the MG2 32).

$$\begin{bmatrix} Tp \\ Pchg \\ \dot{N}e \end{bmatrix} = \begin{bmatrix} c11 & c12 & c13 \\ c21 & c22 & c23 \\ c31 & c32 & c33 \end{bmatrix} \begin{bmatrix} Te \\ Tg \\ Tm \end{bmatrix} \quad (12)$$

In Equation (12), reference characters c ($c_{11}, c_{12}, \ldots$) are constant values determined according to the hardware specifications of the powertrain system 10 (for example, inertias and gear ratios of the respective components), except for the reference characters $c_{22}$ and $c_{23}$ concerning the charge/discharge amount Pchg and the torques Tg and Tm. The reference characters $c_{22}$ and $c_{23}$ change in accordance with changes in the rotational speeds Ng and Nm during the operation.

When the optimal engine speed $Ne^*$ and the optimal engine torque $Te^*$ are determined by the control input determination processing 54, the system operating point (including the engine speed Ne) and the charge/discharge amount Pchg are determined in accordance with these optimal engine speed $Ne^*$ and optimal engine torque $Te^*$. The rate of change $dNe/dt$ of the engine speed is obtained by dividing, by the time step $\Delta t$, a difference ($Ne^*-Ne(k)$) obtained by subtracting the current engine speed $Ne(k)$ from the optimal engine speed $Ne^*$. In Equation (12), the engine speed change rate $dNe/dt$ (i.e., a value based on the optimal engine speed $Ne^*$) and the charge/discharge amount Pchg that are thus determined are used as the target state quantities, in addition to the required driving torque Tp based on a torque request from the driver (i.e., the amount of depression of the accelerator pedal). Because of this, by solving the simultaneous equations expressed by Equation (12), the manipulated variables (Te, Tg, Tm) satisfying these target state quantities can be obtained. The obtained manipulated variables are outputted to the torque devices (the internal combustion engine 20, the MG1 30 and the MG2 32. As a result, in the internal combustion engine 20, the actuators (the throttle valve 22, the fuel injection valves 24 and the ignition device 26) for the engine torque control are controlled in order to achieve the given manipulated variable (Te). Also, regarding the control of the MG1 30 and the MG2 32, the MG1 30 and the MG2 32 are controlled by the inverter 40 so as to achieve the given manipulated variables (Tg and Tm).

1-2-3. Control Routine

Figure 5:
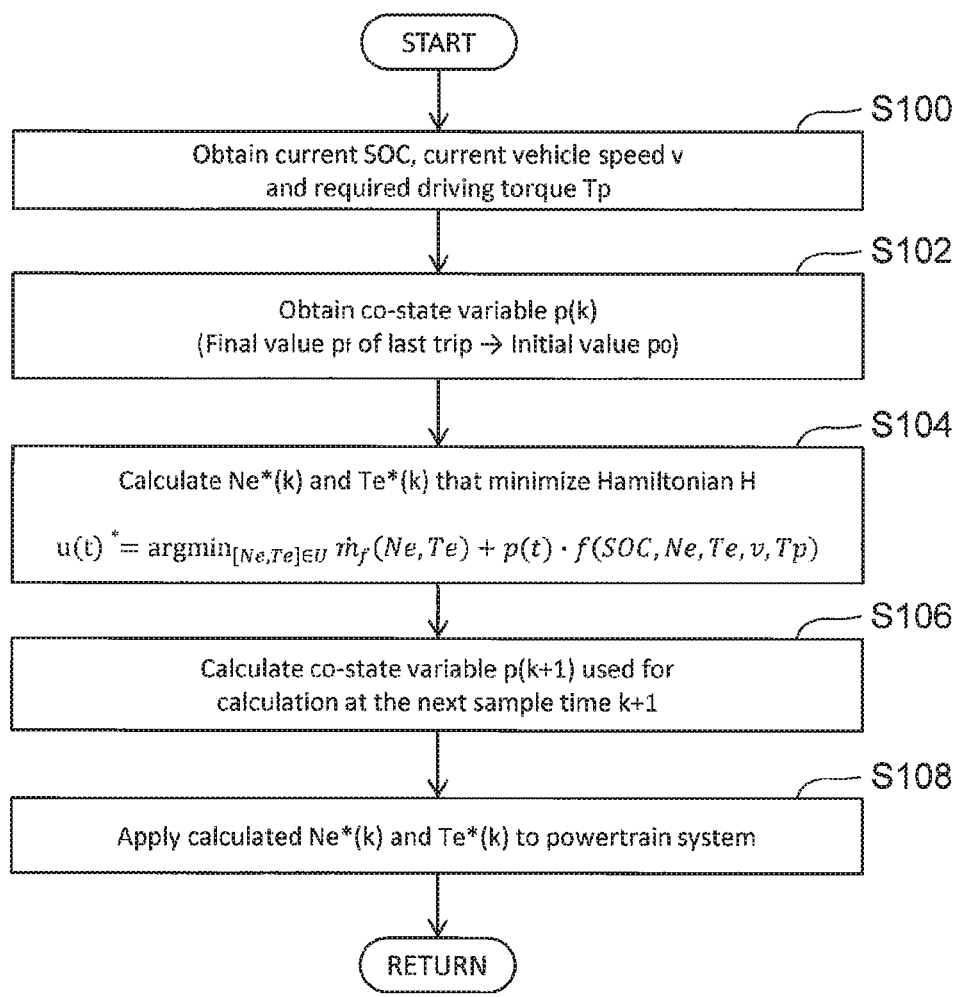
FIG. 5 is a flowchart that illustrates a routine of the processing concerning the powertrain control according to the first embodiment of the present disclosure.

FIG. 5 is a flowchart that illustrates a routine of the processing concerning the powertrain control according to the first embodiment of the present disclosure. This routine is repeatedly executed for each designated time step $\Delta t$, during the operation of the powertrain system 10 (i.e., during one trip) as an example. That is to say, an example of the control time period $\tau$ according to the present embodiment is one trip of the vehicle.

It should be noted that, in the present embodiment, the "control input determination processing 54" is associated with the processing of the following steps S100 to S106, and the "system control processing 56" is associated with the processing of step S108. In more detail, the "co-state variable determination processing 58" is associated with the processing of steps S102 and S106, and the processing of step S104 includes the "control input calculation processing 60" which performs the calculation for the HV mode.

According to the routine shown in FIG. 5, first, in step S100, the control device 50 obtains (calculates) the current (actual) SOC, and obtains the current vehicle speed v and the required driving torque Tp using the sensor group 52. More specifically, the current vehicle speed v is obtained using, for example, a vehicle speed sensor, and the required driving torque Tp is obtained as a value depending on the amount of depression of the accelerator pedal detected by the accelerator position sensor. Thereafter, the processing proceeds to step S102.

In step S102, the control device 50 obtains the co-state variable p(k) of the current sample time k. The memory 50b of the control device 50 stores the final value $p_f$ of the co-state variable p during the last control time period $\tau$. In this example, the last control time period is the same as the time period of the last trip. The control device 50 uses the final value $p_f$ as the initial value $p_0$ in the first calculation after the start of the powertrain control (for example, after the start-up of the powertrain system 10). In the second and subsequent calculations, the co-state variable p(k) calculated at the last sample time k−1 by the processing of step S106 described below is used as the co-state variable p(k) of the current sample time. Thereafter, the processing proceeds to step S104.

It should be noted that, as already described, the initial value $p_0$ may be the average value $p_{AVE}$ of the co-state variable p during the last control time period τ. In the example in which the average value $p_{AVE}$ is used, the average value $p_{AVE}$ of the co-state variable p of the respective sample times k is calculated during each control time period τ, and the most recent average value $p_{AVE}$ is stored in the memory 50b at the end of each control time period τ.

In step S104, the control device 50 solves the optimization problem expressed by Equation (9) described above, and thereby searches for and calculates the optimal control input values u*(k) (i.e., Ne*(k) and Te*(k)) that minimize the Hamiltonian H. In detail, the processing of step S104 includes the control input calculation processing 60 to search for and calculate the optimal control input values $u^{*HV}(k)$ that minimize the Hamiltonian $H_{HV}$ in the HV mode as already described. The optimal control input values u*(k) are determined so as to minimize the Hamiltonian H from the optimal control input values $u^{*HV}(k)$ calculated by the control input calculation processing 60 and the control input values $u^{EV}(k)$ (Ne and Te are both zero) in the EV mode.

After step S104, the processing proceeds to step S106. In step S106, the control device 50 calculates the co-state variable p(k+1) used for the calculation of the subsequent sample time k+1. The calculation manner of the co-state variable p(k+1) is as already described with reference to Equation (7). The calculated co-state variable p(k+1) is stored in the memory 50b. Thereafter, the processing proceeds to step S108.

In step S108, the control device 50 executes the processing (system control processing 56) for applying, to the powertrain system 10, the optimal control input values u*(k) (i.e., Ne*(k) and Te*(k)) calculated by the processing of step S104. As a result, the system operating point and the charge/discharge amount Pchg of the battery 44 that are associated with the optimal control input values u*(k) are determined. Then, as already described, the internal combustion engine 20, the MG1 30 and the MG2 32 are controlled on the basis of the optimal control input values u*(k).

1-3. Effect

According to the powertrain system 10 of the present embodiment described so far, the optimal control input values u*(k) at which the Hamiltonian H defined by Equation (5) is minimized are obtained for each sample time k. Therefore, the optimal control input values u*(k) of the respective sample times k can be determined such that the fuel consumption amount $m_f$ is minimized. As a result, the charge/discharge amount Pchg of the battery 44 and the system operating point can be appropriately determined in accordance with the determined optimal control input values u*(k). Because of this, according to the powertrain control of the present embodiment, the powertrain system 10 can be controlled so as to reduce the fuel consumption amount $m_f$ at each sample time k.

Moreover, according to the control input determination processing 54 of the present embodiment, the final value $p_f$ of the co-state variable p (or the average value $p_{AVE}$ thereof) during the last control time period τ is used as the initial value $p_0$ of the co-state variable p of the target optimization problem. As a result, even if the future vehicle speed v and the future required driving torque Tp (i.e., the vehicle speed v and required driving torque Tp in a time period in which optimization of the control input values u is desired) are unknown, the charge/discharge amount Pchg and the system operating point can be appropriately determined at each sample time k. In addition, since there is no need to predict a future vehicle speed v and a future required driving torque Tp, it is possible to appropriately determine the charge/discharge amount Pchg and the system operating point at each sample time k while reducing the computational load of the processor 50a.

Furthermore, it is meaningful to use, as the initial value $p_0$ of the co-state variable p, the final value $p_f$ (or the average value $p_{AVE}$) of the last control time period r, as described below. First, if the actual SOC deviates greatly from an SOC control center value during the control time period r, there is a possibility that a forced charging or a forced discharge may become necessary and the fuel efficiency may be deteriorated as a result. In order to avoid this kind of situation, it is desirable to control the actual SOC during the control time period τ such that a final SOC (i.e., actual SOC at the end of the control time period τ) approaches the SOC control center value. The reason for this is that, if the final SOC can be controlled so as to approach the SOC control center value, the actual SOC during the control time period τ can be made to transition with the SOC control center value as a reference. Also, the initial value $p_0$ affects the final SOC. That is to say, when the initial value $p_0$ changes, the final SOC changes. Moreover, the co-state variable p(k) calculated for each sample time k changes in accordance with the vehicle driving record (i.e., the record of the vehicle speed v and the required driving torque Tp in the control time period τ). According to Equation (5) concerning the Hamiltonian H, the co-state variable p corresponds to the weight of the power consumption with respect to the fuel consumption. Therefore, in an example in which both the initial actual SOC and the final SOC of the last control time period τ are equal to the SOC control center value (e.g., 60%), if the initial actual SOC of the current control time period τ is 60% and the vehicle driving record (the record of the vehicle speed v and the required driving torque Tp) during the current control time period τ is the same as that of the last control time period τ, it can be expected that, by using the above described final value $p_f$ or average value $p_{AVE}$ as the initial value $p_0$, the final SOC of 60% can be aimed (i.e., the actual SOC during the current control time period τ can transition with the SOC control center value as a reference) also in the current control time period r similarly to the last control time period τ. Based on the above, it can be said that the use of the final value $p_f$ (or the average value $p_{AVE}$) of the last control time period τ as the initial value $p_0$ is equivalent to predicting an appropriate future usage ratio of the fuel and the electric power of the battery 44 on the basis of the driving record in the past (e.g., the last time). In other words, using, as the initial value $p_0$, the final value $p_f$ or the average value $p_{AVE}$ of the last control time period τ can be said to predict an initial value $p_0$ that can achieve the final SOC that is aimed at in the current control time period τ (i.e., that approaches the SOC control center value) from the data obtained in the last control time period τ.

2. Second Embodiment

Then, a second embodiment according to the present disclosure will be described with reference to FIGS. 6 to 9.

2-1. Example of Configuration of Powertrain System

Figure 7:
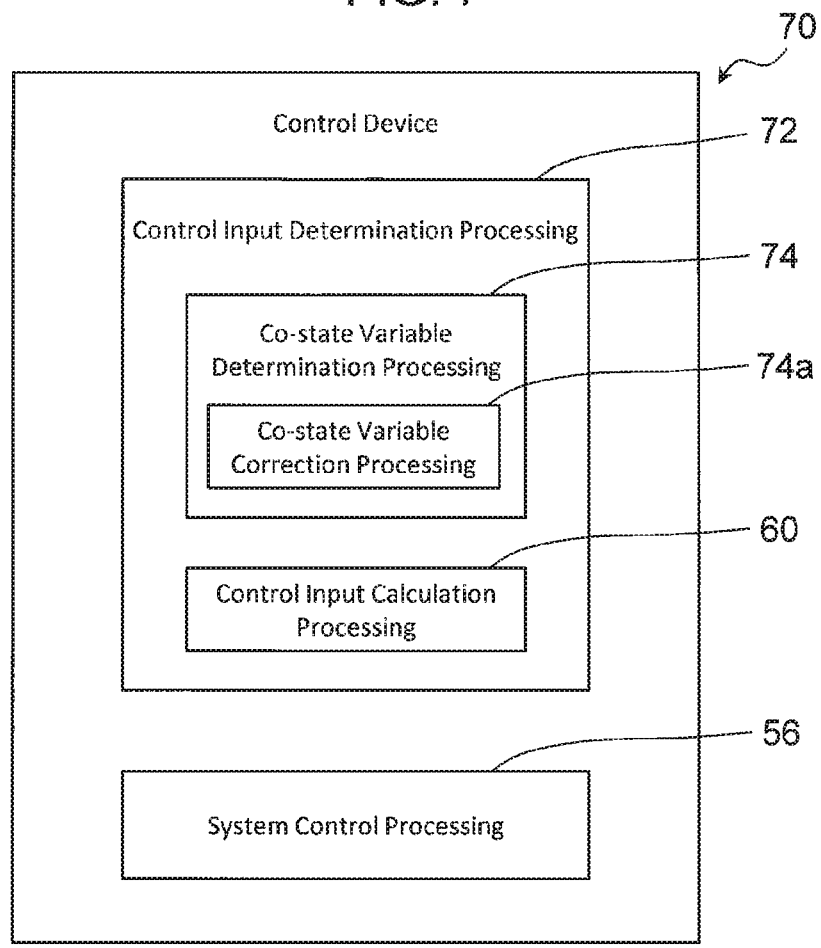
FIG. 7 is a block diagram that illustrates the processing executed by a control device in association with the powertrain control according to the second embodiment of the present disclosure.

A powertrain system according to the second embodiment is similar to the powertrain system 10 according to the first embodiment except that a control device 70 shown in FIG. 7 described below is included instead of the control device 50.

2-2. Powertrain Control

Issue on Control Input Determination Processing 54 According to First Embodiment According to the control input determination processing 54 described above, the final value $p_f$ (or the average value $p_{AVE}$) of the co-state variable p during the last control time period τ is used as the initial value $p_0$ of the co-state variable p. As already described, it can be said that the use of the final value $p_f$ (or the average value $p_{AVE}$) of the last control time period τ as the initial value $p_0$ is equivalent to predicting an appropriate future usage ratio of the fuel and the electric power of the battery 44 on the basis of the driving record in the past (e.g., the last time). In other words, it can be said that the use of the final value $p_f$ or average value $p_{AVE}$ of the last control time periods τ is equivalent to determining the co-state variable p on the assumption that a future driving pattern becomes similar to the past driving pattern without grasping the future driving pattern (i.e., a future transition of the vehicle speed v and required driving torque Tp).

However, the past driving pattern and the future driving pattern are not always the same as each other. In detail, in an example in which the control input determination processing 54 is used, if a future driving pattern differs from the past driving pattern, the actual SOC trajectory (i.e., the center line of the actual SOC that fluctuates with respect to time) may deviate from the SOC control center value (see FIG. 6 described below).

Figure 6:
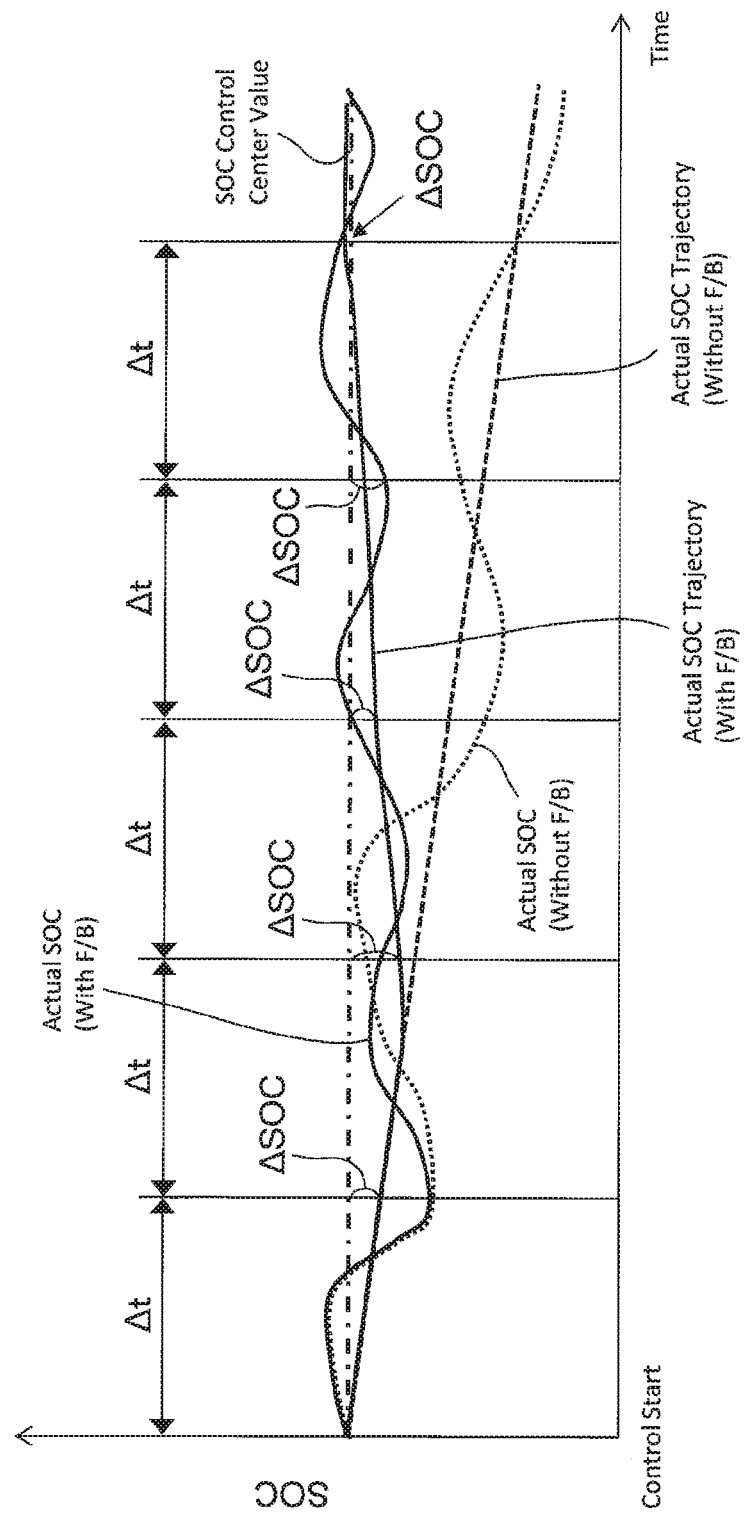
FIG. 6 is a time chart used to compare and describe an issue of the powertrain control according to the first embodiment and a powertrain control according to a second embodiment including measures on the issue.

FIG. 6 is a time chart used to compare and describe the above described issue of the powertrain control according to the first embodiment and the powertrain control according to the second embodiment including measures on the issue. The waveform of the actual SOC shown by the broken line in FIG. 6 shows an example in which a difference of the trajectory of the actual SOC with respect to the SOC control center value occurs during execution of the powertrain control according to the first embodiment. In more detail, FIG. 6 shows an example in which the actual SOC trajectory deviates from the SOC control center value (for example, 60%) to the side where the actual SOC decreases (i.e., the discharge side) with time. In contrast to the example shown in FIG. 6, the actual SOC trajectory may be shifted to the side where the actual SOC is higher than the SOC control center value (i.e., the charging side). The SOC control center value mentioned here corresponds to an example of the "target charging rate" according to the present disclosure.

2-2-2. Outline of Powertrain Control in Consideration of Change in Future Driving Pattern to Past Driving Pattern FIG. 7 is a block diagram that illustrates the processing executed by the control device 70 in association with the powertrain control according to the second embodiment of the present disclosure. The control device 70 is different from the control device 50 according to the first embodiment in terms of the following points. That is to say, the processing executed by the control device 70 in association with the powertrain control includes a "control input determination processing 72" instead of the "control input determination processing 54". Also, a "co-state variable determination processing 74" included in the control input determination processing 72 is different from the co-state variable determination processing 58 according to the first embodiment in that a "co-state variable correction processing 74a" is included in view of the issue described with reference to FIG. 6.

The co-state variable correction processing 74a is performed to correct the co-state variable p on the basis of the difference ΔSOC of the SOC. The difference ΔSOC corresponds to a difference obtained by subtracting the SOC control center value from the actual SOC trajectory. In more detail, according to the co-state variable correction processing 74a, as shown in FIG. 6, the difference ΔSOC is calculated, as an example, for each time step Δt (that is, for each control cycle of the powertrain control according to the present embodiment). The actual SOC trajectory can be obtained, for example, by calculating a moving average line of the actual SOC. The difference ΔSOC corresponds to an example of the "difference between a target charging rate and an actual charging rate of the charging rate SOC" according to the present disclosure.

Figure 8:
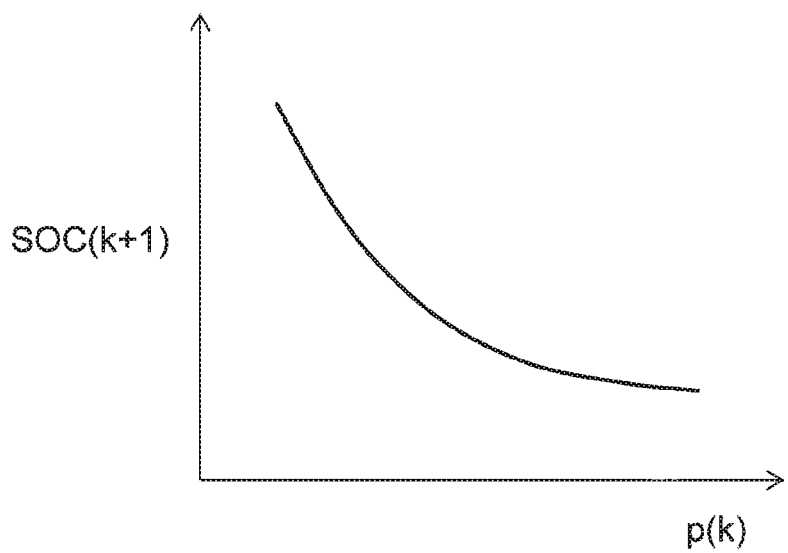
FIG. 8 is a graph that illustrates a relationship between SOC(k+1) and a co-state variable p(k)

The co-state variable correction processing 74a corrects the co-state variable p for each time step Δt (i.e., for each control cycle), as an example, on the basis of the difference ΔSOC calculated as described above. FIG. 8 is a graph that illustrates a relationship between SOC(k+1) and the co-state variable p(k). As shown in FIG. 8, the co-state variable p(k) at the sample time k and the SOC(k+1) at the next sample time k+1 are inversely proportional to each other. In more detail, when the optimal control input values u*(k) are determined in accordance with the co-state variable p(k) and (actual) SOC(k) at the current sample time k, the (actual) SOC(k+1) at the next sample time k+1 changes in accordance with the determined optimal control input values u*(k). Specifically, when the co-state variable p(k) increases, SOC(k+1) becomes lower than SOC(k). In contrast, when the co-state variable p(k) decreases, SOC(k+1) becomes higher than SOC(k).

Next, an example of a correction manner of the co-state variable p based on the difference ΔSOC will be described. The co-state variable p is corrected according to the following Equation (13). That is to say, the co-state variable p after this correction is calculated by adding, to the co-state variable p before the correction, a correction value obtained by multiplying the difference ΔSOC by a designated FB gain. Therefore, the absolute value of this correction value becomes greater when the absolute value of the difference ΔSOC is greater.

$$p \text{ after correction} = p \text{ before correction} + \Delta SOC \cdot FB \text{ Gain} \quad (13)$$

The difference ΔSOC(=actual SOC trajectory−SOC control center value) becomes negative when the actual SOC trajectory is shifted to the discharge side with respect to the SOC control center value (actual SOC<SOC control center value). Therefore, according to Equation (13), when the actual SOC trajectory is shifted to the discharge side, a negative correction value is added to the co-state variable p before the correction, and the co-state variable p is thus corrected so as to be small. In more detail, the co-state variable p is corrected such that the greater (the absolute value of) the difference ΔSOC is, the smaller the co-state variable p becomes. The co-state variable p(k) after the correction is immediately reflected in the calculation of the optimal control input values u*(k) at the same time step Δt. As a result, the powertrain system 10 is controlled such that a decrease in the actual SOC is reduced as compared to that before the correction (i.e., such that the operating time of the internal combustion engine 20 becomes longer in order to reduce the power consumption of the battery 44). As a result, the difference ΔSOC is reduced.

On the other hand, when the actual SOC trajectory is shifted to the charging side (actual SOC>SOC control center value), the difference ΔSOC becomes positive. Therefore, according to Equation (13), when the actual SOC trajectory is shifted to the charging side, a positive correction value is added to the co-state variable p before the correction, and thus, the co-state variable p before the correction is corrected so as to be great. More specifically, the co-state variable p is corrected such that the greater (the absolute value of) the difference ΔSOC is, the greater the co-state variable p becomes. As a result, the powertrain system 10 is controlled such that a decrease in the actual SOC of the battery 44 (that is, the power consumption of the battery 44) is promoted as compared to that before the correction. As a result, the difference ΔSOC is reduced.

As already described, it can be said that the use of the final value $p_f$ (or the average value $p_{AVE}$) of the last control time period τ as the initial value $p_0$ is equivalent to predicting an appropriate future usage ratio of the fuel and the electric power of the battery 44 on the basis of the driving record in the past (e.g., the last time). In this regard, according to the co-state variable correction processing 74a, it can be said that a feedback processing to correct a predicted value (the final value $p_f$ or average value $p_{AVE}$ of the last time) of this kind of usage ratio is performed for each time step Δt on the basis of the difference ΔSOC.

2-2-3. Control Routine

Figure 9:
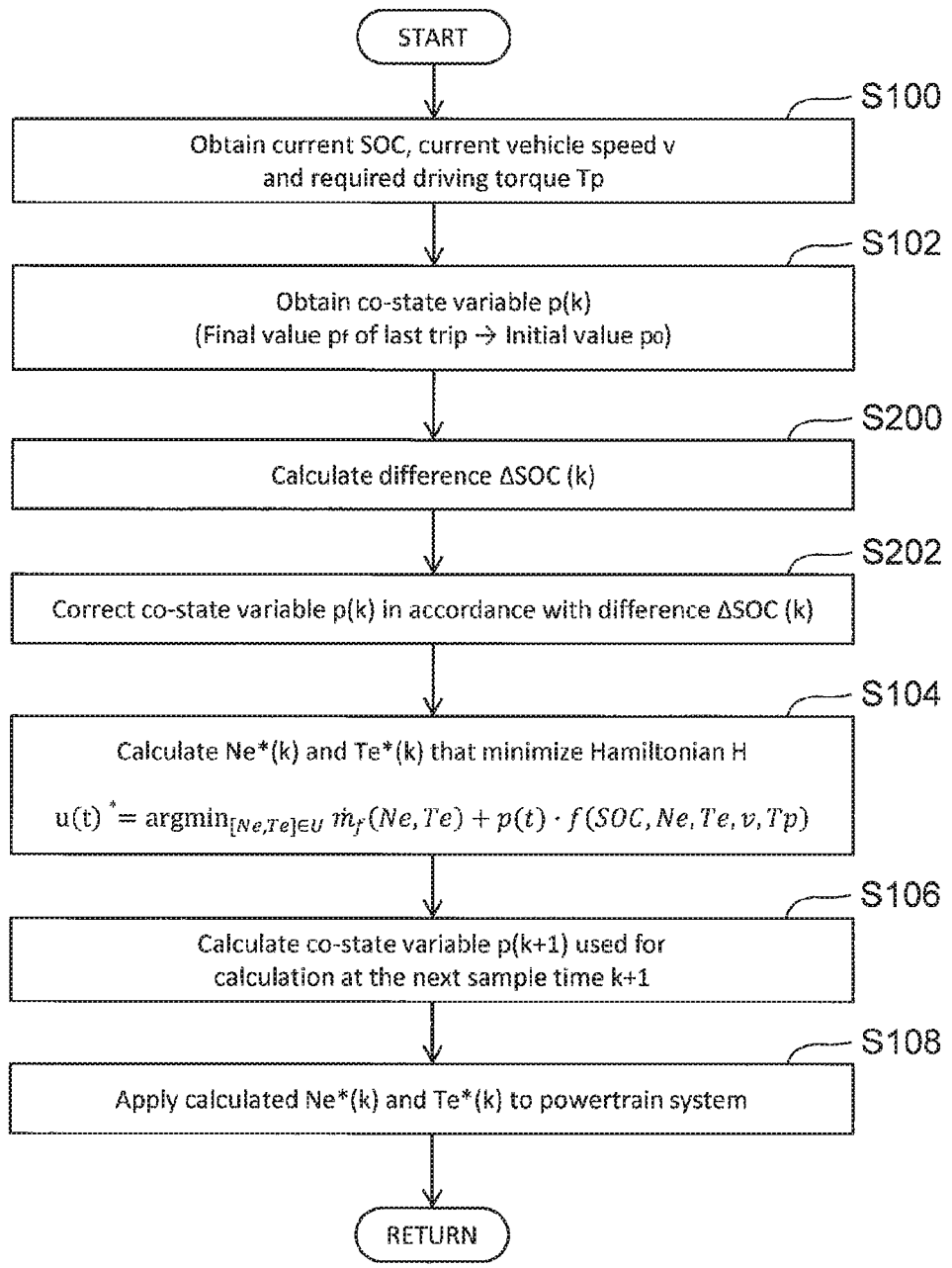
FIG. 9 is a flowchart that illustrates a routine of the processing concerning the powertrain control according to the second embodiment of the present disclosure.

FIG. 9 is a flowchart that illustrates a routine of the processing concerning the powertrain control according to the second embodiment of the present disclosure. The processing of steps S100 to S108 in the routine shown in FIG. 9 is as already described in the first embodiment. The processing of steps S200 and S202 of the present routine is associated with the "co-state variable correction processing 74a".

According to the routine shown in FIG. 9, the processing proceeds to step S200 after step S102. In step S200, the control device 70 calculates the difference ΔSOC(k) at the current sample time k. An example of the calculation manner of the difference ΔSOC is as described with reference to FIGS. 6 and 7. Thereafter, the processing proceeds to step S202.

In step S202, the control device 70 corrects the co-state variable p(k) obtained in step S102 in accordance with the difference ΔSOC(k) calculated in step S200. In detail, as an example, the correction value is calculated using Equation (13) described above, and the co-state variable p(k) is corrected by the calculated correction value. As a result, when the actual SOC trajectory is shifted to the discharge side with respect to the SOC control center value, the co-state variable p(k) is decreased, and conversely, when the actual SOC trajectory is shifted to the charge side, the co-state variable p(k) is increased. It should be noted that, when the difference ΔSOC(k) is zero, the co-state variable p(k) is not corrected.

Thereafter, the processing proceeds to step S104. As a result, the co-state variable p(k) after the correction by the processing of step S202 is reflected in the calculation of the optimal control input values u*(k) by the processing of step S104.

2-3. Effect

As described so far, the co-state variable determination processing 74 of the control input determination processing 72 executed by the control device 70 according to the present embodiment includes the co-state variable correction processing 74a. According to the co-state variable correction processing 74a, during execution of the powertrain control, the co-state variable p is corrected for each time step Δt in accordance with the difference ΔSOC. As a result, as can be seen from a comparison between the two actual SOC waveforms in FIG. 6, according to the example of the solid line (i.e., the second embodiment which is associated with the feedback of the SOC (the co-state variable correction processing 74a)), the center value of the actual SOC trajectory during the execution of the powertrain control can be caused to approach the SOC control center value as compared to the example of the broken line (i.e., the first embodiment which is not associated with the feedback of the SOC). In other words, the final SOC of the current control time period τ can be caused to approach the SOC control center value. Because of this, it is possible to reduce the necessity of performing a forced charging or a forced discharging during the control time period τ. Consequently, according to the powertrain control of the present embodiment, the system operating point and the charge/discharge amount Pchg of the battery 44 that minimize the fuel consumption amount $m_f$ can be more appropriately determined even when the driving pattern in the current control time period τ differs from the driving pattern in the last control time period τ, while not requiring the prediction of the vehicle speed v and the required driving torque Tp similarly to the powertrain control according to the first embodiment.

2-4. Another Example of Execution Timing of Co-state Variable Correction Processing In the second embodiment described above, the co-state variable correction processing 74a to correct the co-state variable p for each time step Δt has been taken as an example. However, the "co-state variable correction processing" according to the present disclosure may be repeatedly executed during a control time period in which the powertrain control is performed at, for example, a desired cycle longer than the time step Δt (i.e., the control cycle of the powertrain control), instead of the example described above.

3. Third Embodiment

Next, a third embodiment according to the present disclosure will be described with reference to FIGS. 10 to 16.

3-1. Example of Configuration of Powertrain System

Figure 12:
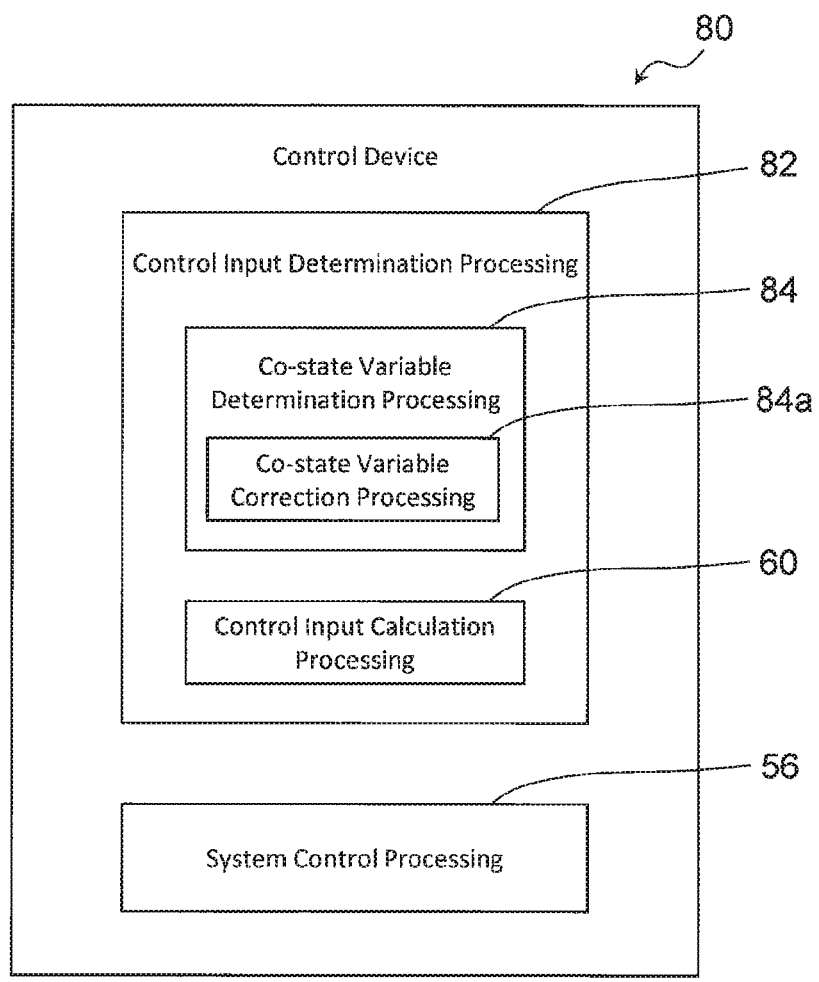
FIG. 12 is a block diagram that illustrate the processing executed by a control device in association with a powertrain control according to a third embodiment of the present disclosure.

A powertrain system according to the third embodiment is similar to the powertrain system according to the second embodiment except that a control device 80 shown in FIG. 12 described below is included instead of the control device 70.

Figure 10:
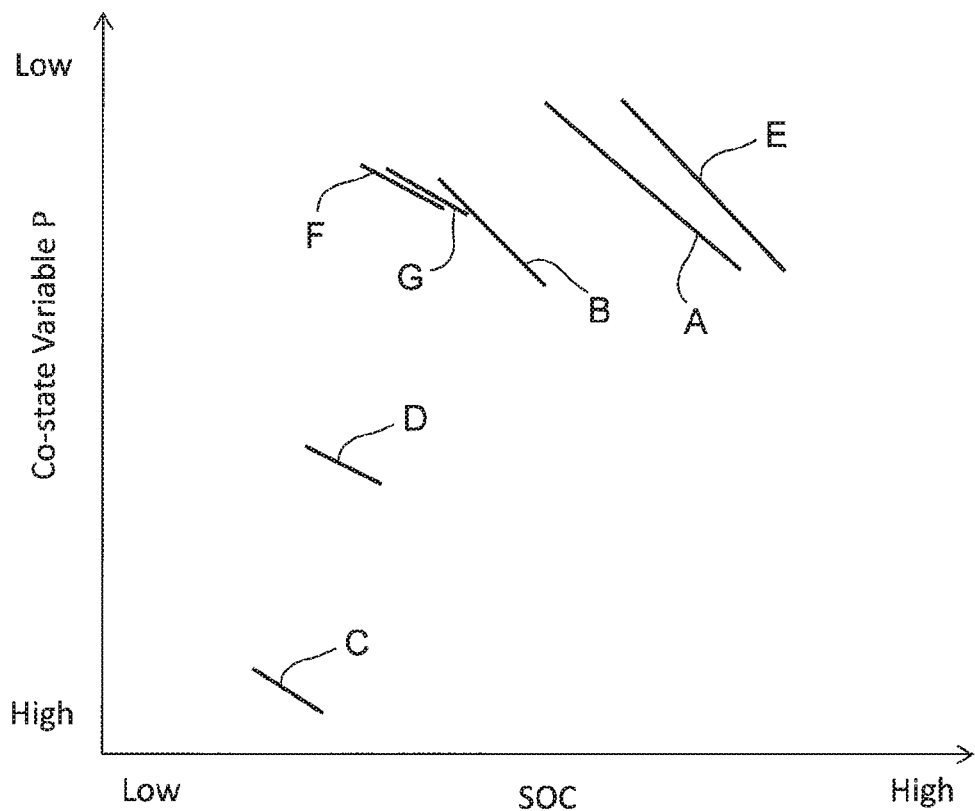
FIG. 10 is a graph that illustrates relationships between the co-state variable p and the SOC separately for respective vehicle driving modes.

3-2. Powertrain Control 3-2-1. Issue on Co-State Variable Correction Processing 74a According to Second Embodiment FIG. 10 is a graph that illustrates relationships between the co-state variable p and the SOC separately for the respective vehicle driving modes. The modes A to G are exemplified in FIG. 10. Each straight line in FIG. 10 corresponds to an approximate straight line of plotted values of the data of the co-state variable p and (actual) SOC sampled at each designated time interval during use of each vehicle driving mode.

According to the example shown in FIG. 10, information of various vehicle driving patterns is obtained using the modes A to G. More specifically, the mode A corresponds to the WLTC (World harmonized Light vehicles Test Cycle) mode, which includes an urban mode, a suburban mode and a highway mode. The mode B corresponds to the HWY mode, which is one of the U.S. highway modes. The mode C corresponds to a mode that simulates a traffic jam driving in an urban area in Japan. The mode D corresponds to another traffic jam driving mode that simulates a traffic jam driving in a large city. The mode E corresponds to the US06 mode, which is another U.S. highway mode. The mode F corresponds to the LA #4 mode that simulates a driving pattern in a suburb of Los Angeles. The mode G corresponds to the JC08 mode previously used in Japan.

Figure 11:
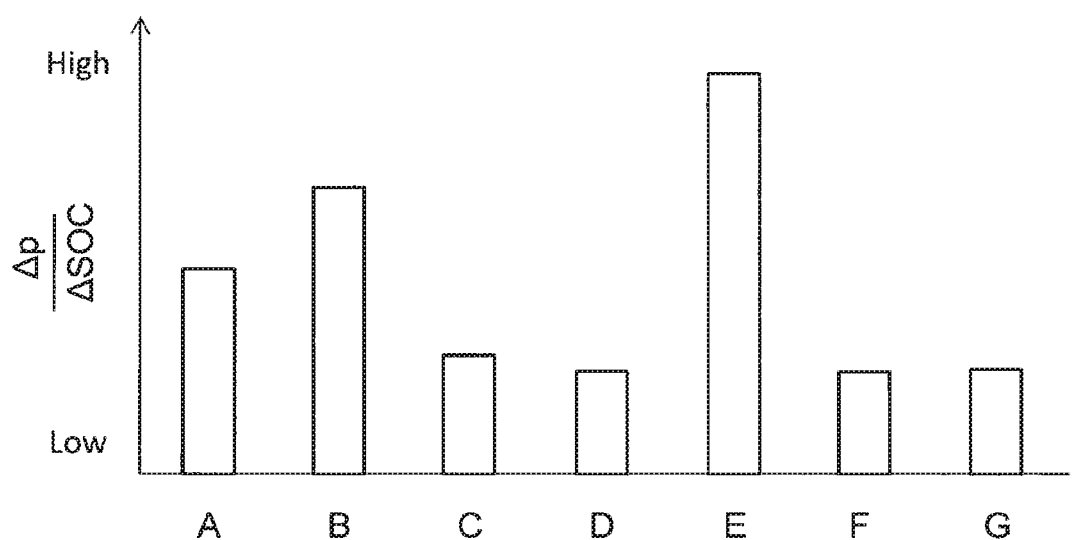
FIG. 11 is a graph that shows the sensitivity of the co-state variable p with respect to SOC (i.e., a ratio ΔP/ΔSOC), as compared between modes A and G.

Different vehicle driving modes result in different ways of driving the vehicle (typically, different ways of change in the vehicle speed v and the vehicle driving torque (required driving torque Tp)). As a result, as shown in FIG. 10, the relationships between the co-state variable p and the SOC differ depending on the vehicle driving modes. In more detail, as can be seen from the difference in the slope (i.e., ratio $\Delta P/\Delta SOC$) of each approximate straight line shown in FIG. 10, the sensitivity of the co-state variable p with respect to the SOC changes due to a difference in the vehicle driving modes. FIG. 11 is a graph that shows the sensitivity of the co-state variable p with respect to SOC (i.e., the ratio $\Delta P/\Delta SOC$), as compared between the modes A and G.

According to the co-state variable correction processing 74a (feedback processing) of the second embodiment described above, the co-state variable p is corrected in accordance with the difference $\Delta SOC$ of the SOC (more specifically, the amount of difference of the actual SOC trajectory with respect to the target SOC trajectory (SOC control center value)). On the other hand, as described above with reference to FIGS. 10 and 11, the sensitivity of the co-state variable p with respect to the SOC changes in accordance with the vehicle driving mode (i.e., vehicle driving pattern). This means that the optimal value of a FB gain used for conversion from the difference $\Delta SOC$ to the correction amount (the second term on the right-hand side of Equation (13)) changes in accordance with the vehicle driving pattern.

Accordingly, if the FB gain used in the feedback processing as described above is a fixed value, there is a possibility that the FB gain may be no longer appropriate under vehicle driving patterns other than the vehicle driving patterns assumed at the time of the setting of the FB gain. This may lead to a deterioration in the fuel efficiency of the hybrid vehicle. In addition, even where the FB gain used is not a fixed value, the issue as described above may similarly occur if the FB gain is not changed in consideration of the fact that the sensitivity of the co-state variable p with respect to the SOC changes in accordance with the vehicle driving mode.

3-2-2. Outline of Co-State Variable Correction Processing 84a According to Third Embodiment FIG. 12 is a block diagram that illustrate the processing executed by the control device 80 in association with the powertrain control according to the third embodiment of the present disclosure. The control device 80 is different from the control device 70 according to the second embodiment in terms of the following points. That is to say, the processing executed by the control device 80 in association with the powertrain control includes a "control input determination processing 82" and the "system control processing 56". A "co-state variable determination processing 84" included in this control input determination processing 82 is different from the co-state variable determination processing 74 according to the second embodiment in that a "co-state variable correction processing 84a" is included in place of the "co-state variable correction processing 74a" in view of the issue described with reference to FIGS. 10 and 11.

The co-state variable correction processing 84a is different from the co-state variable correction processing 74a in that an FB gain set as follows is used. In detail, the FB gain used in the present embodiment is set on the basis of the driving record of the hybrid vehicle. As a specific example of the driving record, an average vehicle speed aveV and an average driving torque aveTp are used.

The average vehicle speed aveV corresponds to an average value of the vehicle speeds v during a designated time period. The average driving torque aveTp corresponds to an average value of the vehicle driving torques (required driving torques Tp) during a designated time period. An example of these designated time periods is 30 seconds retroactively from the current point in time. As just described, according to the present embodiment, in order to set the FB gain, the driving record immediately before the current point in time is used.

It should be noted that the FB gain corresponds to an example of the "gain" according to the present disclosure. In addition, the designated time period for the calculation of the average vehicle speed aveV corresponds to an example of the "first designated time period" according to the present disclosure, and the designated time period for the calculation of the average driving torque aveTp corresponds to an example of the "second designated time period" according to the present disclosure. In the example described above, the first designated time period and the second designated time period are the same as each other, but they are not necessarily the same.

Figure 13:
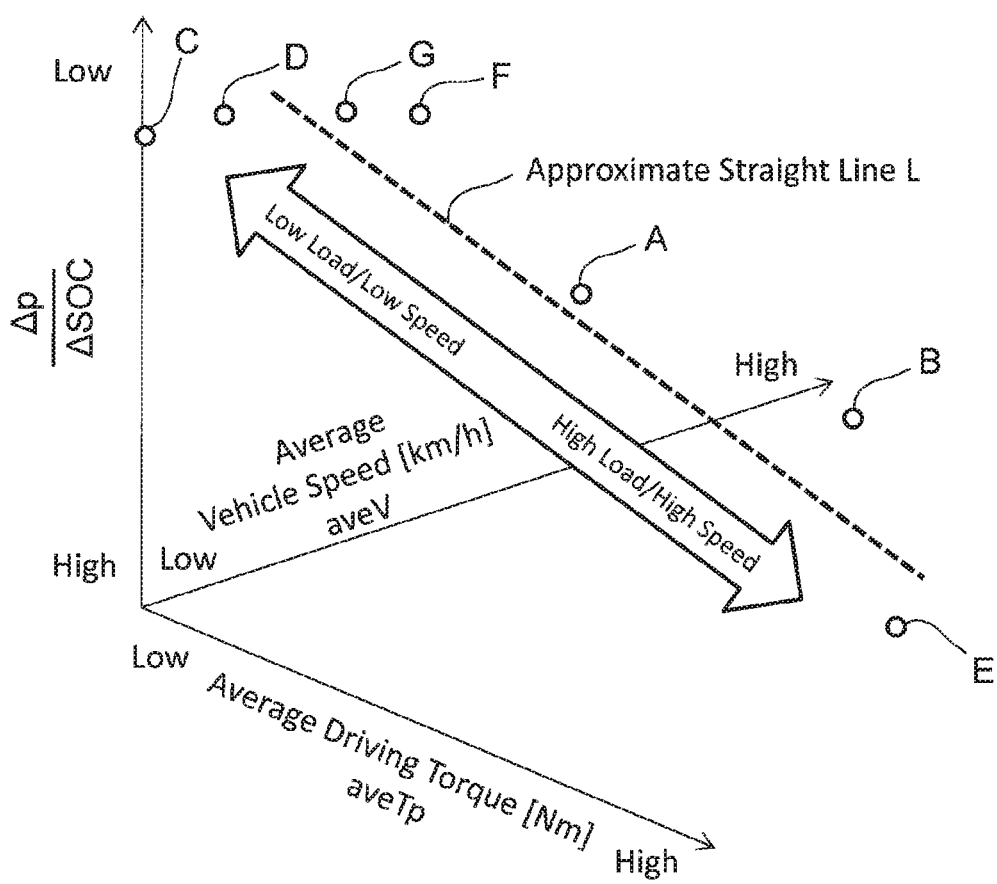
FIG. 13 is a graph that illustrates relationships between an average vehicle speed aveV, an average driving torque aveTp and the ratio ΔP/ΔSOC for the respective vehicle driving modes.

FIG. 13 is a graph that illustrates relationships between the average vehicle speed aveV, the average driving torque aveTp and the ratio $\Delta P/\Delta SOC$ for the respective vehicle driving modes. In more detail, plotted points associated with the respective vehicle driving modes (modes A to G) correspond to average values of the overall data (aveV, aveTp and $\Delta P/\Delta SOC$) during use of the respective vehicle driving modes. Thus, the modes A to G are distributed as shown in FIG. 13 in accordance with the average vehicle driving load (average vehicle driving torque) and the average vehicle speed during the individual modes.

An approximate straight line L in FIG. 13 corresponds to an approximate straight line associated with the plotted points of the modes A to G. As shown by the approximate straight line L, the higher the average vehicle speed aveV is, the higher the ratio $\Delta P/\Delta SOC$ becomes. In addition, the higher the average driving torque aveTp is, the higher the ratio $\Delta P/\Delta SOC$ becomes. As just described, from the three-dimensional relationship shown in FIG. 13, it can be seen that the ratio $\Delta P/\Delta SOC$ has a high correlation with the average vehicle speed aveV and the average driving torque aveTp.

From the above knowledge, by using the average vehicle speed aveV and the average driving torque aveTp, it becomes possible to appropriately obtain the ratio $\Delta P/\Delta SOC$ based on the immediately preceding driving record with respect to the current point in time (that is, the sensitivity of the co-state variable p with respect to the SOC).

Equation (14) described below shows an example of an equation for calculating the FB gain used in the co-state variable correction processing 84a according to the present embodiment. As shown in Equation (14), according to the present embodiment, the ratio ΔP/ΔSOC, which is a function of the average vehicle speed aveV and the average driving torque aveTp, is used as the FB gain.

$$FB\ Gain = \frac{\Delta p}{\Delta SOC} = A \cdot aveV + B \cdot aveTp + C \quad (14)$$

As shown in Equation (14), as an approximate equation of the ratio ΔP/ΔSOC, a linear equation in which the average vehicle speed aveV and the average driving torque aveTp are independent variables can be used. Coefficients A, B, and C in the approximate equation are set in advance by, for example, using a multiple regression analysis, such as a least squares method. By the use of this kind of approximate equation, it becomes possible to obtain (estimate) an appropriate FB gain according to the ratio ΔP/ΔSOC based on the immediately preceding driving record with respect to the current point in time (i.e., the sensitivity of the co-state variable p with respect to the SOC).

In addition, by the use of the ratio ΔP/ΔSOC having the relationship as shown in FIG. 13, the FB gain is set so as to be greater when the average vehicle speed aveV is higher. Furthermore, the FB gain is set so as to be greater when the average driving torque aveTp is higher.

It should be noted that the approximate equation used for the setting of the FB gain is not limited to the example of the linear equation described above, and may be a quadratic or higher order equation. In order to set the FB gain, a map (not shown) that defines the relationship of the ratio ΔP/ΔSOC with respect to the average vehicle speed aveV and the average driving torque aveTp may be used instead of this kind of approximate equation.

3-2-3. Control Routine

Figure 14:
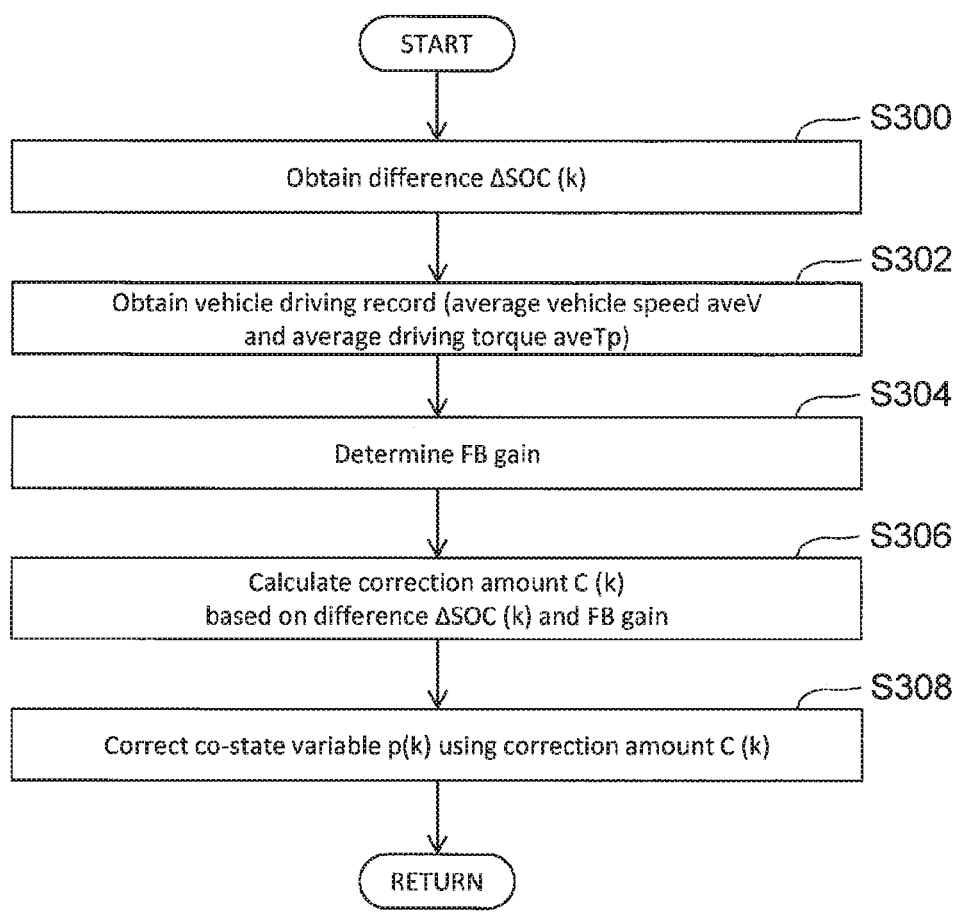
FIG. 14 is a flowchart that illustrates a subroutine of the processing executed to correct the co-state variable p(k) in accordance with a difference ΔSOC(k) in the powertrain control according to the third embodiment of the present disclosure.

A main routine (not shown) of the processing concerning the powertrain control according to the present embodiment is different from the routine shown in FIG. 9 according to the second embodiment in that the processing of a subroutine shown in FIG. 14 is executed instead of the processing of step S202.

FIG. 14 is a flowchart that illustrates a subroutine of the processing executed to correct the co-state variable p(k) in accordance with the difference ΔSOC(k) in the powertrain control according to the third embodiment of the present disclosure. It should be noted that, in the present embodiment, the processing of step S200 (see FIG. 9) and the processing of the subroutine shown in FIG. 14 correspond to the "co-state variable correction processing 84a".

According to the subroutine shown in FIG. 14, first, the control device 80 obtains the difference ΔSOC(k) in step S300. The obtained difference ΔSOC(k) is a calculated value by the processing of step S200. Thereafter, the processing proceeds to step S302.

In step S302, the control device 80 obtains the vehicle driving record immediately before the current point in time. In detail, the control device 80 obtains the average vehicle speed aveV and the average driving torque aveTp in the designated time period described above (for example, 30 seconds retroactively from the current point in time). These are, more particularly, moving average values. That is to say, since the processing of the present subroutine is repeatedly executed for each time step Δt, the time series data of the vehicle speed v used for the calculation of the average vehicle speed aveV according to this step S300 is updated for each time step Δt. The same applies to the average driving torque aveTp.

The vehicle speed v used for the calculation of the average vehicle speed aveV can be obtained using, for example, a vehicle speed sensor. The vehicle driving torque used for the calculation of the average driving torque aveTp is, for example, the required vehicle driving torque Tp. As already described, the required driving torque Tp can be obtained, for example, as a value depending on the amount of depression of the accelerator pedal detected by the accelerator position sensor. In addition, the vehicle driving torque used for the calculation of the average driving torque aveTp may be an actual driving torque.

Additionally, in a time period from the start of a new trip (the current trip) of the hybrid vehicle to the end of the designated time period described above, the average vehicle speed aveV and the average driving torque aveTp in the designated time period cannot be calculated satisfactorily using only the data of the vehicle speed v and the required driving torque Tp obtained after the start of the current trip. During this kind of time period, the average vehicle speed aveV and the average driving torque aveTp may be calculated while additionally using the data of the vehicle speed v and the required driving torque Tp immediately before the end of the last trip. However, the average vehicle speed aveV and the average driving torque aveTp may be calculated using only the data obtained after the current trip is started without using the data during the last trip. Moreover, the designated time period used for the calculation of the average vehicle speed aveV and the average driving torque aveTp is not necessarily limited to the time period immediately before the current point in time (that is, the time period specified retroactively from the current point in time), and may be a time period specified retroactively from a point in time before a designated time period with respect to the current point in time.

After step S302, the processing proceeds to step S304. In step S304, the control device 80 determines the FB gain. More specifically, the control device 80 calculates the FB gain depending on the average vehicle speed aveV and average driving torque aveTp obtained by the processing of step S302 using Equation (14) described above. Thereafter, the processing proceeds to step S306.

In step S306, the control device 80 calculates a correction amount C(k) of the co-state variable p(k). The correction amount C(k) mentioned here corresponds to the second term on the right-hand side of Equation (13) described above. Therefore, the control device 80 calculates, as the correction amount C(k), a product of the difference ΔSOC(k) obtained in step S300 and the FB gain determined in step S304. Thereafter, the processing proceeds to step S308.

In step S308, the control device 80 corrects the co-state variable p(k) obtained in step S102 by using the correction amount C(k) calculated by the processing of step S306, in accordance with Equation (13) described above.

3-3. Effect

FIGS. 15A and 15B are time charts used to describe the operation in examples of using a co-state variable correction processing (comparative examples 1 and 2) referred to for a comparison with the co-state variable correction processing 84a according to the third embodiment of the present disclosure. In the co-state variable correction processing according to the comparative examples 1 and 2, a fixed value is used as the FB gain.

First, in the comparative example 1 shown in FIG. 15A, a time period from a time point t1 to a time point t2 corresponds to a time period in which the FB gain (fixed value) is suitable for the way of driving the vehicle during this time period. Because of this, in this time period, the actual SOC trajectory favorably follows the SOC control center value (target SOC trajectory).

Then, the time point t2 corresponds to a time point at which the way of driving the vehicle has changed. It is assumed that the way of driving after this change is continued in a time period after the time point t2. It is also assumed that, in the time period after the time point t2 in the comparative example 1, the FB gain (fixed value) is too small with respect to the ideal FB gain due to a change in the way of driving. As a result, in the comparative example 1, the correction of the co-state variable p according to the co-state variable correction processing does not work satisfactorily, and as shown in FIG. 15A, the actual SOC trajectory gradually shifts, with a lapse of time, to the side where the actual SOC becomes lower than the SOC control center value (i.e., to the discharge side). At a time point t3, the actual SOC is lowered to a level at which a forced charging is required. Moreover, if the forced charging is actually performed, the fuel efficiency of the internal combustion engine 20 is deteriorated.

It should be noted that the comparative example 1 shows a situation in which the actual SOC changes to the discharge side because the FB gain is too small. However, in some circumstances, the actual SOC may change to the charging side due to the FB gain being too small, and as a result, a forced discharging may need to be performed. In addition, when the forced discharging is actually performed, unnecessary discharge from the battery 44 is performed, which leads to a deterioration of the fuel efficiency of the internal combustion engine 20.

On the other hand, in the time period after the time point t2 in the comparative example 2 shown in FIG. 15B, it is assumed that the FB gain (fixed value) is excessively large with respect to the ideal FB gain due to a change in the way of driving. As a result, in the comparative example 2, the correction of the co-state variable p according to the co-state variable correction processing works excessively, and the actual SOC trajectory fluctuates largely with respect to the SOC control center value as shown in FIG. 15B. As a result, unnecessary discharge/charge of the battery 44 occurs. This may lead to at least one of a deterioration of the fuel efficiency of the internal combustion engine 20 and a deterioration of the battery 44.

Figure 16:
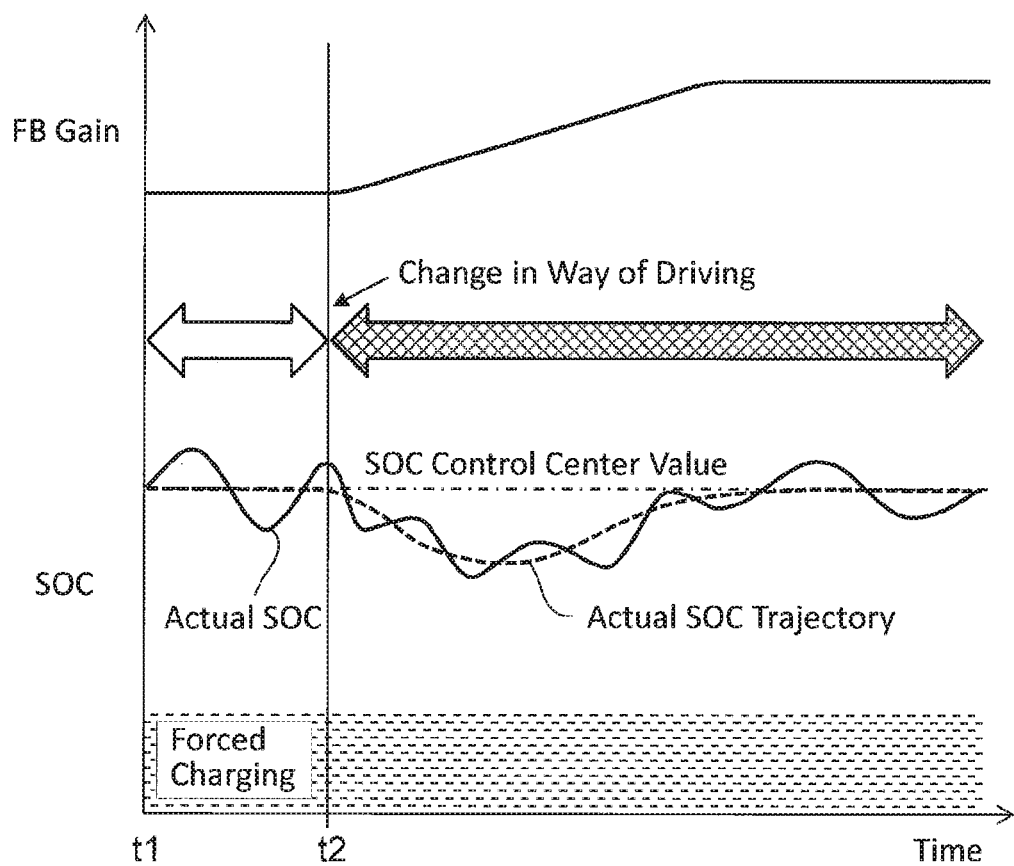
FIG. 16 is a time chart used to describe the operation in an example of using the co-state variable correction processing according to the third embodiment of the present disclosure.

FIG. 16 is a time chart used to describe the operation in the example of using the co-state variable correction processing 84a according to the third embodiment of the present disclosure. According to the co-state variable correction processing 84a of the present embodiment, as described above, the FB gain is set (changed) on the basis of the driving record (average vehicle speed aveV and average driving torque aveTp) of the hybrid vehicle. In more detail, after the way of driving the vehicle is changed at the time point t2 shown in FIG. 16, the average vehicle speed aveV and the average driving torque aveTp are updated for each time step Δt. That is to say, the data after the change in the way of driving is gradually reflected on each of the values of the average vehicle speed aveV and the average driving torque aveTp.

Furthermore, in association with the update of the average vehicle speed aveV and the average driving torque aveTp, the ratio ΔP/ΔSOC, which is the FB gain, is also gradually updated. That is to say, learning of the ratio ΔP/ΔSOC (FB gain) proceeds so as to reflect the way of driving after the change. As a result, the FB gain gradually approaches a value suitable for the way of driving after the change. It should be noted that, in the example shown in FIG. 16, the FB gain gradually increases so as to have a value suitable for the way of driving after the change.

According to the co-state variable correction processing 84a of the present embodiment, as described above, when the way of driving is changed, the FB gain is changed so as to have a value suitable for the way of driving after the change. As a result, as exemplified in FIG. 16, even when the way of driving changes, an excessive increase in the difference of the actual SOC trajectory with respect to the SOC control center value is reduced. Then, after the FB gain converges to a value suitable for the way of driving after the change, the actual SOC trajectory can be appropriately converged to the SOC control center value as shown in FIG. 16.

Moreover, according to the co-state variable correction processing 84a of the present embodiment, the FB gain is set such that the higher the average vehicle speed aveV is, the greater the FB gain becomes. As a result, the FB gain can be appropriately set in consideration of the characteristics that the ratio ΔP/ΔSOC indicating the sensitivity of the co-state variable p with respect to the SOC becomes higher when the average vehicle speed aveV is higher. Furthermore, the FB gain is set such that the higher the average driving torque aveTp is, the greater the FB gain becomes. As a result, the FB gain can be appropriately set in consideration of the characteristics that the ratio ΔP/ΔSOC indicating the above described sensitivity becomes higher when the average driving torque aveTp is higher.

3-4. Other Examples of Driving Record Used for Gain Setting

In the third embodiment described above, both of the average vehicle speed aveV and the average driving torque aveTp are used to set the gain (FB gain). However, instead of this kind of example, either one of the average vehicle speed aveV and the average driving torque aveTp may be used to set the gain. Moreover, instead of the average driving torque aveTp (Nm), an average driving power (kW), which is an average value of vehicle driving power during a designated time period, may be used.

Moreover, the driving record used to set the gain may include, for example, an average vehicle acceleration in addition to at least one of the average vehicle speed and the average driving torque. The average vehicle acceleration mentioned here is an average value of the acceleration of the hybrid vehicle during a designated time period, and the acceleration includes not only a positive acceleration but also a negative acceleration (i.e., deceleration). This designated time period used for the calculation of the average vehicle acceleration may be the same as or different from the designated time period used for the calculation of at least one of the average vehicle speed and the average driving torque. Then, as an example, when an average vehicle acceleration aveA is used in addition to the average vehicle speed aveV and the average driving torque aveTp, the gain (FB gain) may be determined in accordance with, for example, the following Equation (15), based on the same idea as in Equation (14) described above.

$$FB\ Gain = \frac{\Delta p}{\Delta SOC} = A \cdot aveV + B \cdot aveTp + C \cdot aveA + D \tag{15}$$

Furthermore, the driving record used to set the gain may include, for example, an average vehicle jerk in addition to at least one of the average vehicle speed and the average driving torque, or may include the average vehicle acceleration and the average vehicle jerk in addition to at least one of the average vehicle speed and the average driving torque. The average vehicle jerk mentioned here is an average value of the jerk of the hybrid vehicle during a designated time period. The jerk includes not only a positive jerk but also a negative jerk. This designated time period used for the calculation of the average vehicle jerk may be the same as or different from the designated time period used for the calculation of at least one of the average vehicle speed and the average driving torque, and also the designated time period used for the calculation of the average vehicle acceleration. Then, as an example, when the average vehicle acceleration aveA and an average vehicle jerk aveJ are used in addition to the average vehicle speed aveV and the average driving torque aveTp, the gain (FB gain) may be determined in accordance with, for example, the following equation (16), based on the same idea as in Equation (14) described above.

$$FB\ Gain = \frac{\Delta p}{\Delta SOC} = A \cdot aveV + B \cdot aveTp + C \cdot aveA + D \cdot aveJ + E \tag{16}$$

In addition, the acceleration used for the calculation of the average vehicle acceleration described above may be obtained using an acceleration sensor (G sensor). The jerk used for the calculation of the average vehicle jerk may be obtained by differentiating the outputs of the acceleration sensor with time, or may be obtained using a jerk sensor. Moreover, these acceleration and jerk may be obtained as estimated values based on the operation information of the accelerator pedal, for example, as follows.

Specifically, the acceleration may be estimated as a value, for example, depending on the amount of depression (or the force of depression) of the accelerator pedal using a relational information (such as, a relational formula or a map) that defines a relationship between the amount of depression (or the force of depression) and the acceleration. In addition, the jerk may be estimated as a value, for example, depending on the speed of depression of the accelerator pedal using a relational information (such as, a relational formula or a map) that defines a relationship between the speed of depression and the jerk.

4. Other Embodiments

4-1. Another Example of Powertrain Systems

In the first to third embodiments described above, the powertrain system 10 corresponding to the hybrid system of the power split type using the power split device 34 shown in FIG. 1 has been described. However, the "powertrain system" according to the present disclosure is not limited to the example described above, as long as it includes an internal combustion engine and an electric motor that are configured to drive a hybrid vehicle, and a battery configured to supply an electric power to the electric motor. That is to say, the powertrain system according to the present disclosure may be configured as, for example, a hybrid system of the parallel type in which an internal combustion engine and an electric motor that are configured to drive a vehicle are connected in parallel.

4-2. Another Example of Control Input Value for Powertrain System

In the first to third embodiments described above, the engine speed Ne and the engine torque Te are used as the control input values u. However, the "one or more control input values" to be optimized according to the present disclosure are not limited to the example described above, depending on the configuration of the powertrain system. That is to say, for example, in a powertrain system including an internal combustion engine combined with a stepped automatic transmission, a gear position of the automatic transmission may be used as the control input value as well as the engine torque Te, instead of the engine speed Ne. This is because, when the selected gear position is known, the engine speed Ne can be determined based on the vehicle speed. It should be noted that, in an example including a stepped automatic transmission, when the gear position is changed, the engine speed Ne changes discontinuously (i.e., in a step-wise fashion). For this reason, when searching for an optimal control input value, the Hamiltonian may be calculated for each gear position, and the automatic transmission may be controlled such that a gear position associated with a Hamiltonian which is the smallest of a plurality of calculated Hamiltonians is selected.

The embodiments and modification examples described above may be combined in other ways than those explicitly described above as required and may be modified in various ways without departing from the scope of the present disclosure.

What is claimed is:

1. A powertrain system, comprising:
an internal combustion engine configured to drive a hybrid vehicle;
an electric motor configured to drive the hybrid vehicle;
a battery configured to supply an electric power to the electric motor; and
a control device configured to perform a powertrain control for controlling the internal combustion engine and the electric motor,
wherein the control device is configured, during a control time period in which the powertrain control is performed, to:
execute a control input determination processing to solve an optimization problem that minimizes, with respect to a speed and a driving torque of the hybrid vehicle, a fuel consumption amount $m_f$ of the internal combustion engine during the control time period while taking dynamics of a charging rate SOC of the battery as a constraint, and thereby calculate one or more control input values that determine a charge/discharge amount of the battery and a system operating point of the powertrain system; and
execute a system control processing to apply, to the powertrain system, the one or more control input values calculated by the control input determination processing, and thereby control the internal combustion engine and the electric motor, and
wherein the control input determination processing includes:
a co-state variable determination processing to update a co-state variable p of the optimization problem for each time step while using, as an initial value of the co-state variable p, a final value or an average value of the co-state variable p during a last control time period; and a control input calculation processing to use the co-state variable p determined by the co-state variable determination processing and search for and calculate, for each time step, the one or more control input values that minimize an Hamiltonian H defined by a following equation:

$$H = \dot{m}_f + p \cdot \dot{SOC}$$

where a first term on a right-hand side of the equation denotes a time rate of change $dm_f/dt$ of the fuel consumption amount $m_f$, and a second term on the right-hand side denotes a product of the co-state variable p and a time rate of change dSOC/dt of the charging rate SOC.

2. The powertrain system according to claim 1, wherein the co-state variable determination processing includes a co-state variable correction processing to correct the co-state variable p based on a difference between a target charging rate and an actual charging rate of the charging rate SOC.

3. The powertrain system according to claim 2, wherein, where the actual charging rate is lower than the target charging rate, the co-state variable correction processing decreases the co-state variable p.

4. The powertrain system according to claim 2, wherein, where the actual charging rate is higher than the target charging rate, the co-state variable correction processing increases the co-state variable p.

5. The powertrain system according to claim 2, wherein a correction amount of the co-state variable p according to the co-state variable correction processing is a product of the difference and a gain, and wherein the gain is set based on a driving record of the hybrid vehicle.

6. The powertrain system according to claim 5, wherein the driving record includes at least one of an average vehicle speed that is an average value of the speed during a first designated time period and an average driving torque that is an average value of the driving torque during a second time designated period.

7. The powertrain system according to claim 6, wherein, where the driving record includes the average vehicle speed, the higher the average vehicle speed is, the greater the gain is.

8. The powertrain system according to claim 6, wherein, where the driving record includes the average driving torque, the higher the average driving torque is, the greater the gain is.

* * * * *